United States Patent
Lee et al.

(10) Patent No.: US 10,489,048 B2
(45) Date of Patent: Nov. 26, 2019

(54) ELECTRONIC DEVICE AND CONTROL METHOD OF ELECTRONIC DEVICE

(71) Applicant: SAMSUNG ELECTRONICS CO., LTD., Suwon-si, Gyeonggi-do (KR)

(72) Inventors: Yo-Han Lee, Seongnam-si (KR); Geon-Soo Kim, Suwon-si (KR); Kyu-Hong Kim, Yongin-si (KR); So-Young Kim, Suwon-si (KR); Bo-Kun Choi, Seoul (KR); Seung-Min Choi, Seongnam-si (KR); Yong-Jin Kwon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/699,170

(22) Filed: Sep. 8, 2017

(65) Prior Publication Data

US 2018/0074676 A1    Mar. 15, 2018

(30) Foreign Application Priority Data

Sep. 9, 2016 (KR) .................. 10-2016-0116792

(51) Int. Cl.
*G06F 3/041* (2006.01)
*G06F 3/0488* (2013.01)
(Continued)

(52) U.S. Cl.
CPC .......... *G06F 3/0488* (2013.01); *G06F 3/0414* (2013.01); *G06F 3/0416* (2013.01);
(Continued)

(58) Field of Classification Search
None
See application file for complete search history.

(56) References Cited

U.S. PATENT DOCUMENTS

2006/0132455 A1    6/2006  Rimas-Ribikauskas et al.
2011/0115734 A1*   5/2011  Harashima .............. G06F 3/016
                                                            345/173
(Continued)

FOREIGN PATENT DOCUMENTS

KR    10-2013-0062763    6/2013
KR    10-2013-0065046    6/2013

OTHER PUBLICATIONS

Extended Search Report dated Dec. 20, 2017 in counterpart European Patent Application No. 17190304.0.
(Continued)

*Primary Examiner* — Parul H Gupta
(74) *Attorney, Agent, or Firm* — Nixon & Vanderhye P.C.

(57) ABSTRACT

An electronic device and a control method of the electronic device are provided. The electronic device includes: a housing including a first surface facing in a first direction and a second surface facing in a second direction opposite the first direction; a touchscreen display disposed between the first surface and the second surface, and exposed through the first surface; a pressure sensor disposed between the first surface and the second surface, and configured to detect a pressure applied on the touchscreen display by an external object; at least one processor electrically connected to the touchscreen display, the pressure sensor, and a wireless communication circuit; and a memory electrically connected to the processor. The memory stores instructions which when executed by the processor cause the electronic device to perform operations comprising: displaying a user interface including at least one item on the touchscreen display; receiving an input for selecting at least one item through the touchscreen display; sensing a pressure applied, to and/or around, the at least one item on the display using the pressure sensor while the input is received; selecting a part of the user interface at least partially based on the input and the sensed pressure;

(Continued)

and providing a visual effect on the user interface based at least in part on the sensed pressure wherein the selected part of the user interface is displayed to appear concave compared with the remaining part of the user interface.

13 Claims, 32 Drawing Sheets

(51) Int. Cl.
    *G06F 3/0484*     (2013.01)
    *G01L 1/14*     (2006.01)
    *G06F 3/0481*     (2013.01)

(52) U.S. Cl.
    CPC ...... *G06F 3/04842* (2013.01); *G06F 3/04845* (2013.01); *G01L 1/14* (2013.01); *G06F 3/04817* (2013.01); *G06F 2203/04105* (2013.01); *G06F 2203/04804* (2013.01)

(56) References Cited

U.S. PATENT DOCUMENTS

| | | |
|---|---|---|
| 2013/0106842 A1 | 5/2013 | Miyazawa |
| 2013/0117698 A1* | 5/2013 | Park ................... G06F 3/04817 |
| | | 715/765 |
| 2013/0145313 A1 | 6/2013 | Roh et al. |
| 2014/0244738 A1* | 8/2014 | Rydenhag ............. G06F 3/1423 |
| | | 709/204 |
| 2016/0062530 A1 | 3/2016 | Huppi et al. |

OTHER PUBLICATIONS

Technobuffalo, "3D Touch Explained: Peek,Pop, and Quick Actions!" You Tube, Sep. 26, 2015, pp. 1-5, url:https://www.youtube.com/watch?v=5sT1L7zUXc.

* cited by examiner

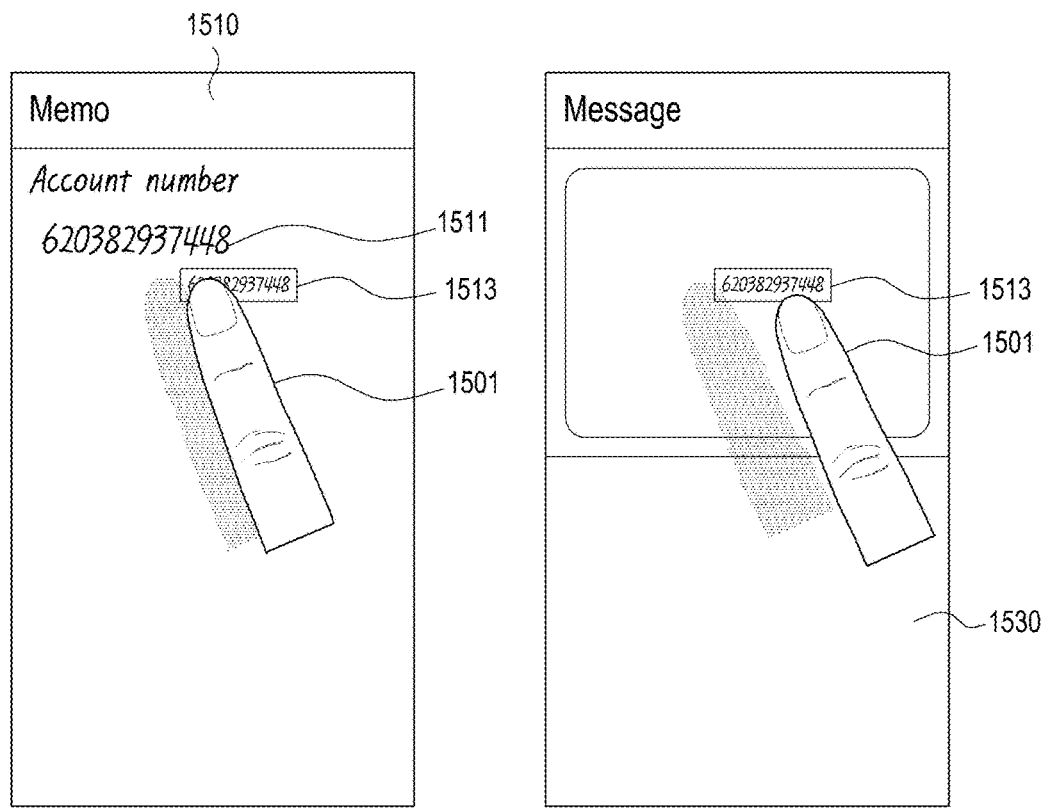
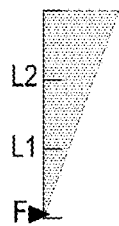  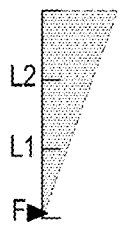
FIG.15C  FIG.15D

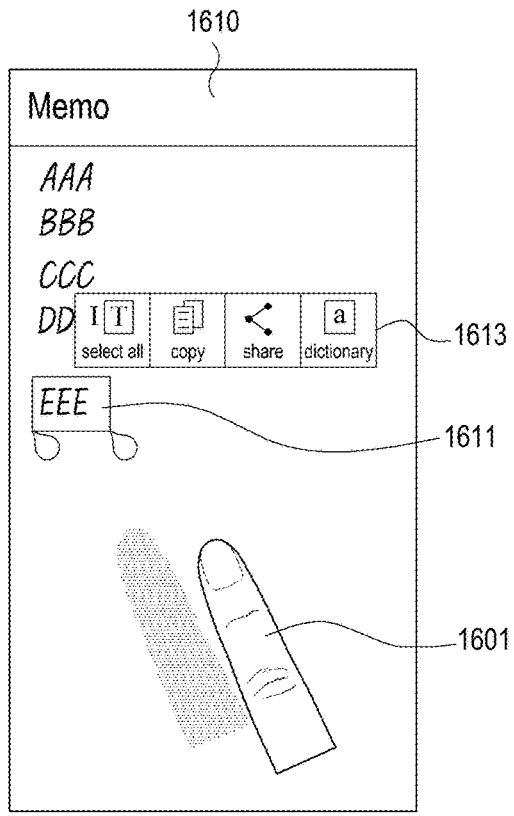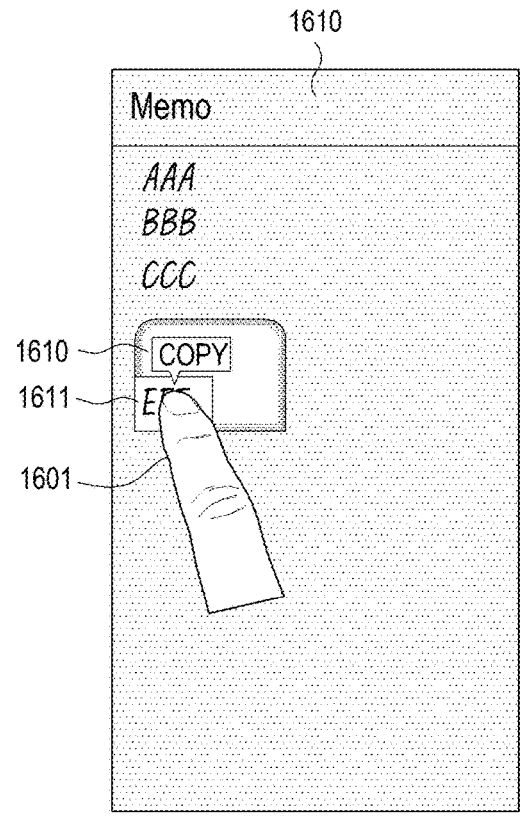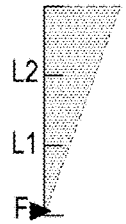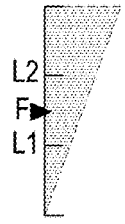
FIG.16A          FIG.16B

ELECTRONIC DEVICE AND CONTROL METHOD OF ELECTRONIC DEVICE

CROSS-REFERENCE TO RELATED APPLICATION

This application is based on and claims priority under 35 U.S.C. § 119 to Korean Application Serial No. 10-2016-0116792, which was filed in the Korean Intellectual Property Office on Sep. 9, 2016, the content of which is incorporated by reference herein in its entirety.

TECHNICAL FIELD

The present disclosure relates generally to an electronic device for controlling operation of the electronic device using a pressure input, and to a control method of the electronic device.

BACKGROUND

As electronic technologies have developed, various types of electronic products have also been developed, and have come to be widely utilized. Particularly, portable electronic devices including various functions, such as smart phones, tablet PCs, or the like, have been widely propagated.

Also, recently, there have been attempts to provide various services through electronic devices using a pressure input by a user, in addition to a touch input.

To control the operation of an electronic device, a user needs to provide user input, such as a touch or the like, to the electronic device, and needs to anticipate an operation of the electronic device to be performed in response to a predetermined input before providing the predetermined input. In this instance, learning is required on the part of a user.

Also, an electronic device which can use a touch input and a pressure input together has been developed, and accordingly, a user needs to selectively provide a touch input and a pressure input to control an electronic device to be operated as the user intends. As described above, as various input schemes for controlling an electronic device have been developed, the various input schemes may require a larger amount of learning on the part of a user.

SUMMARY

Therefore, various example embodiments of the present disclosure provide an electronic device, which is intuitive and convenient for a user when the user controls the electronic device using a touch input and a pressure input, and a control method thereof.

To overcome the above-described problem or other problems, an electronic device according to any one of various example embodiments is provided, the electronic device including: a housing including a first surface facing in a first direction and a second surface facing in a second direction opposite the first direction; a touchscreen display disposed between the first surface and the second surface, and exposed through the first surface; a pressure sensor disposed between the first surface and the second surface, and configured to detect pressure applied to the touchscreen display by an external object; at least one processor electrically connected to the touchscreen display, the pressure sensor, and a wireless communication circuit; and a memory electrically connected to the processor. The memory includes instructions that when executed by the processor cause the electronic device to perform: displaying a user interface including at least one item on the touchscreen display; receiving an input for selecting at least one item through the touchscreen display; sensing pressure applied to, and/or around, the at least one item on the display using the pressure sensor while the input is received; selecting a part of the user interface at least partially based on the input and the sensed pressure; and providing a visual effect on the user interface based on at least a part of the sensed pressure wherein the selected part of the user interface is displayed to appear concave compared with the remaining part of the user interface.

According to any one of various example embodiments of the present disclosure, an electronic device is provided, including: a housing including a first surface facing a first direction and a second surface facing a second direction opposite the first direction; a touchscreen display disposed between the first surface and the second surface, and exposed through the first surface; a pressure sensor disposed between the first surface and the second surface, and configured to detect pressure applied on the touchscreen display by an external object; at least one processor electrically connected to the touchscreen display, the pressure sensor, and a wireless communication circuit; and a memory electrically connected to the processor, wherein the memory is configured to store a first application program including a first user interface and a second application program including a second user interface, and the memory includes instructions that when executed by the processor, cause the electronic device to perform: displaying the first user interface on the touchscreen display; receiving an input for providing at least one item through the first user interface; displaying the at least one item of the first user interface; sensing pressure applied to, and/or around, the at least one item on the display using the pressure sensor while the at least one item of the first user interface is displayed; and displaying the second user interface on the touchscreen display based on at least a part of the sensed pressure wherein the second user interface includes the at least one item.

According to any one of various example embodiments of the present disclosure, an electronic device is provided, including: a housing including a first surface facing a first direction and a second surface facing a second direction opposite the first direction; a touchscreen display disposed between the first surface and the second surface, and exposed through the first surface; a pressure sensor disposed between the first surface and the second surface, and configured to detect pressure applied from the outside; and at least one processor electrically connected to the touchscreen display and the pressure sensor, wherein the processor is configured to perform: displaying a first user interface including at least one first item on the touchscreen display; sensing pressure applied by an external medium using the at least one pressure sensor upon reception of a touch input for the at least one first item, which is displayed on the touchscreen display; generating a second user interface including at least one second item, which is related to the first item, when the pressure is sensed; and changing a display property of a partial area related to the second item in the first user interface and the second user interface based on a pressure value based on the sensed pressure and performing display.

According to any one of various example embodiments of the present disclosure, a method of controlling an electronic device is provided, the method including: displaying a user interface including at least one item on a touchscreen display of the electronic device; receiving an input for selecting at least one item through the touchscreen display; sensing pressure applied to, and/or around, the at least one item on the display using the pressure sensor while the input is received; selecting a part of the user interface at least partially based on the input and the sensed pressure; and providing a visual effect to the user interface based on at least a part of the sensed pressure such that the selected part of the user interface is displayed to appear concave compared with the remaining part of the user interface.

According to any one of various example embodiments of the present disclosure, a method of controlling an electronic device is provided, the method including: displaying a first user interface on a touchscreen display of the electronic device; receiving an input for providing at least one item through the first user interface; displaying the at least one item of the first user interface; sensing pressure applied on, and/or close to, the at least one item on the display using the pressure sensor while the at least one item of the first user interface is displayed; and enabling the second user interface to include the at least one item based on at least a part of the sensed pressure.

According to an electronic device of various example embodiments and a method of providing information by the electronic device, a user can control the electronic device using a touch input and a pressure input, whereby an intuitive UI/UX corresponding to the characteristics of pressure input is provided and the usability of the electronic device is improved.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIGS. 15A, 15B, 15C, 15D, 15E and 15F are diagrams illustrating examples of displaying user interfaces on a display of an electronic device according to various example embodiments of the present disclosure;

FIGS. 16A, 16B, 16C, 16D, 16E and 16F are diagrams illustrating examples of displaying user interfaces on a display of an electronic device according to various example embodiments of the present disclosure;

DETAILED DESCRIPTION

Figure 1:
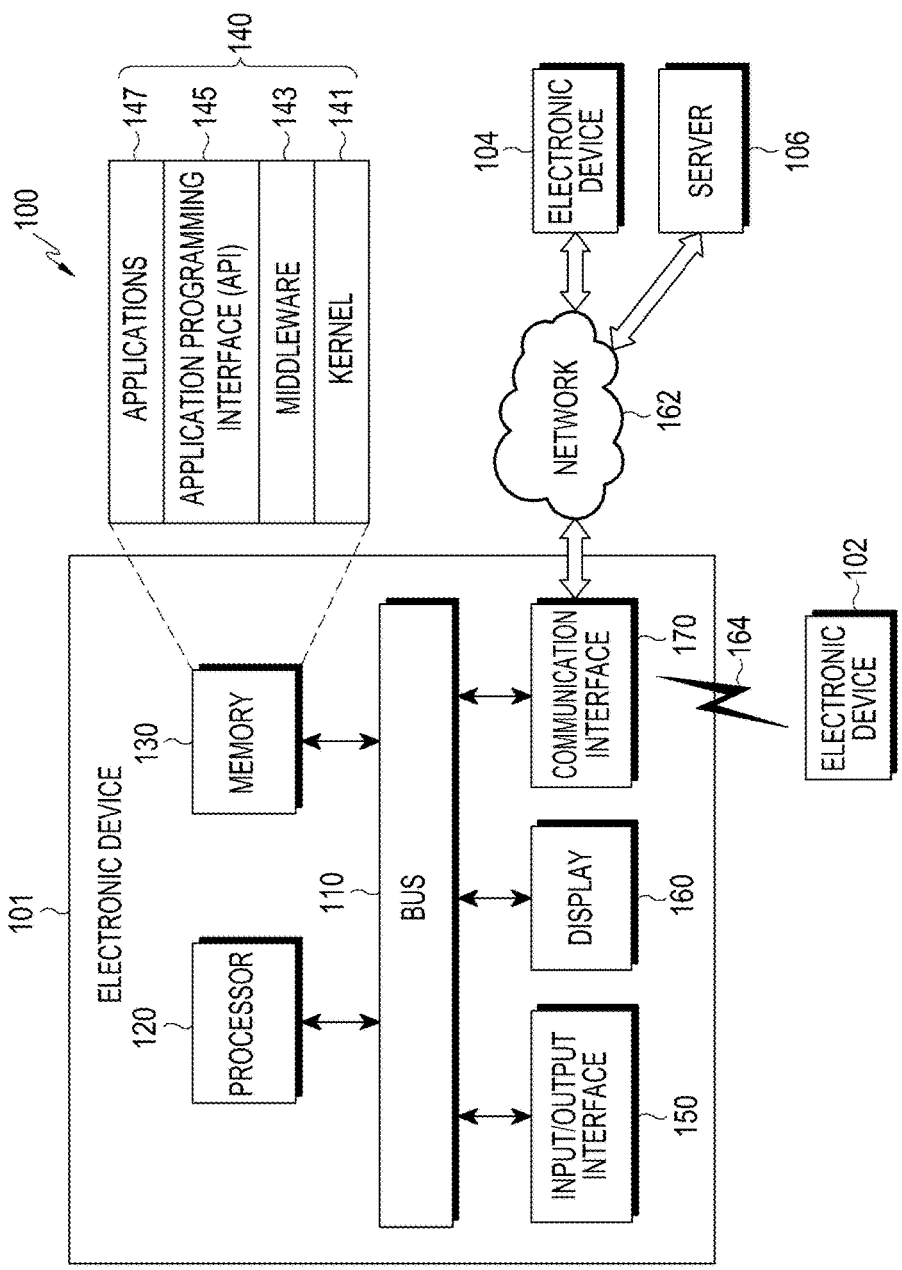
FIG. 1 is a diagram illustrating an example network environment including an example electronic device according to various example embodiments of the present disclosure.

Hereinafter, various example embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise.

The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStatiod™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various example embodiments will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the elements, or may further include other elements.

The bus 110 may include, for example, a circuit that interconnects the elements 110 to 170 and transfers communication (e.g., control messages and/or data) between the elements.

The processor 120 may include various processing circuitry, such as, for example, and without limitation, one or more of a dedicated processor, a central processing unit (CPU), an application processor, and a Communication Processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an Operating System (OS). The kernel 141 may control or manage system resources (e.g., the bus 110, the processor 120, or the memory 130) used for executing an operation or function implemented by other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to use the system resources (e.g., the bus 110, the processor 120, or the memory 130) of the electronic device 101 to one or more of the application programs 147, and may process the one or more task requests. The API 145 is an interface used by the application 147 to control a function provided from the kernel 141 or the middleware 143, and may include, for example, at least one interface or function (e.g., an instruction) for file control, window control, image processing, character control, or the like. For example, the input/output interface 150 may forward instructions or data, which are input from a user or an external device, to the other element(s) of the electronic device 101, or may output instructions or data, which are received from the other element(s) of the electronic device 101, to a user or an external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display, or the like, but is not limited thereto. The display 160 may display, for example, various types of content (e.g., text, images, videos, icons, and/or symbols) for a user. The display 160 may include a touchscreen and may receive, for example, a touch input, a gesture input, a proximity input, or a hovering input using an electronic pen or a body part of a user.

The communication interface 170 may include various communication circuitry and configure communication, for example, between the electronic device 101 and an external device (e.g., a first external electronic device 102, a second external electronic device 104, or a server 106). For example, the communication interface 170 may be connected to a network 162 through wireless or wired communication to communicate with an external device (e.g., the second external electronic device 104 or the server 106). Additionally, the communication interface 170 may establish a short-range wireless communication connection with, for example, and without limitation, an electronic device (e.g., first external electronic device 102).

The wireless communication may include, for example, cellular communication that uses at least one of LTE, LTE-Advanced (LTE-A), Code Division Multiple Access (CDMA), Wideband CDMA (WCDMA), Universal Mobile Telecommunications System (UMTS), wireless broadband (WiBro), Global System for Mobile Communications (GSM), or the like. According to an embodiment, the wireless communication may include, for example, at least one of Wi-Fi, Bluetooth, Bluetooth low energy (BLE), ZigBee, Nearfield Communication (NFC), magnetic secure transmission, Radio Frequency (RF), and Body Area Network (BAN). According to an embodiment, the wireless communication may include a GNSS. The GNSS may be, for example, a Global Positioning System (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include a telecommunications network, for example, at least one of a computer network (e.g., a LAN or a WAN), the Internet, and a telephone network.

Each of the first and second external electronic devices 102 and 104 may be of a type which is the same as or different from that of the electronic device 101. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device (e.g., the electronic device 102 or 104, or the server 106) may execute the requested functions or the additional functions, and may deliver the result of execution thereof to the electronic device 101. The electronic device 101 may provide the received result as it is, or may additionally process the received result to provide the requested functions or services. To this end, for example, cloud computing, distributed computing, or client-server computing technology may be used.

Figure 2A:
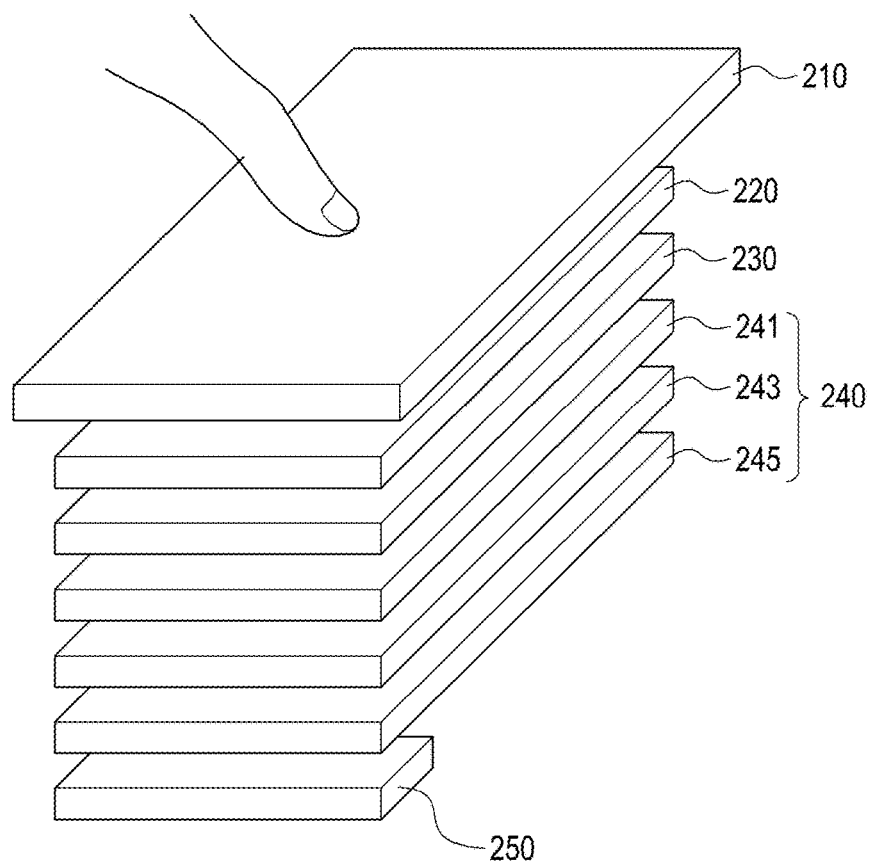
FIGS. 2A and 2B are diagrams illustrating example disposition of a display and a pressure sensor in an electronic device according to various example embodiments of the present disclosure.
Figure 2B:
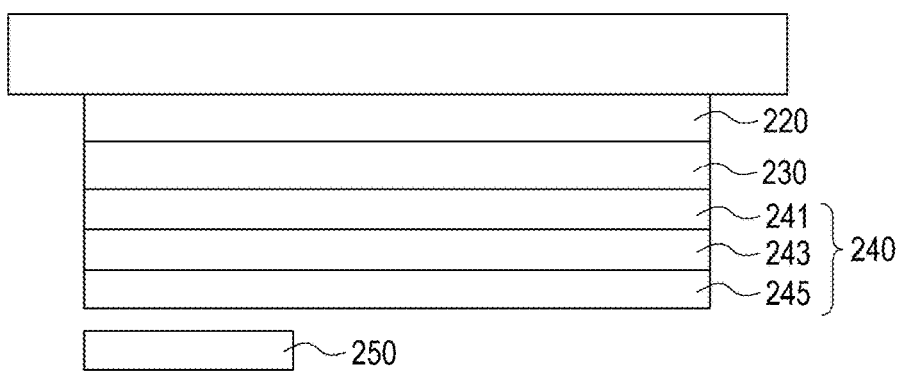

FIGS. 2A and 2B are diagrams illustrating example disposition of a display and a pressure sensor in an electronic device according to various example embodiments of the present disclosure.

The electronic device (e.g., the electronic device 101 of FIG. 1) may include a housing and a display. The housing includes a first surface facing a first direction, a second surface facing a direction opposite the first direction, and a lateral side which encloses space between the first surface and the second surface. The display may be disposed between the first surface and the second surface, and may be exposed through the first surface.

Referring to FIGS. 2A and 2B, in the electronic device, a cover window 210, which is made of a transparent material in order to protect the display 230, may be disposed on the first surface, through which the display 230 is exposed, and a touch sensor module including a touch sensor 220 may be disposed between the display 230 and the cover window 210. Here, an electrode of the touch sensor 220 may be embedded in the display 230, and the display 230 may be a touchscreen display which is capable of sensing a touch input using the embedded touch sensor 220 when a touch is provided by an external medium (e.g., a hand of a user or a touch pen (stylus pen)).

Also, the electronic device may include a sensor module, which includes, for example, and without limitation, at least one pressure sensor 240 and may be disposed under the display 230. For example, the at least one pressure sensor 240 may include a first electrode 241, a dielectric layer 243, and a second electrode 245, and may be configured to sense capacitance or induced current, or the like, which may be generated as pressure is applied by a hand of a user, and to detect a pressure value (e.g., at least one level and/or location).

For example, the dielectric layer 243 of the pressure sensor 240 may include materials such as silicon, air foam, membrane, OCA, sponge, rubber, ink, polymer (PC, PTE, etc.), or the like. Also, when the first electrode 241 and/or the second electrode 245 of the pressure sensor 240 is opaque, the first electrode 241 and/or the second electrode 245 may include at least one of Cu, Ag, Mg, Ti, and Graphene. When the first electrode 241 and/or the second electrode 245 of the pressure sensor 240 is transparent, the first electrode 241 and/or the second electrode 245 may include at least one of ITO, IZO, Ag nanowire, metal mesh, a transparent polymer conductor, and graphene. One of the first electrode 241 and the second electrode 245 may be a plate GND, and the other may be a repeated polygonal pattern. For example, the pressure sensor 240 may use a self-capacitance scheme. One of the first electrode 241 and the second electrode 245 may be a first-direction pattern (TX), and the other may be a second-direction pattern (RX) which is orthogonal to the first direction. For example, the pressure sensor 240 may be a mutual capacitance scheme. The first electrode 241 may be formed on a Flexible Printed Circuit Board (FPCB), and may be attached to the display 230 or may be electrically connected to a part of the display 230.

Also, the pressure sensor 240 may use a current induction scheme, in addition to the above-described self-capacitance scheme, or mutual capacitance scheme. It is apparent to those skilled in the art that any unit that is capable of sensing the magnitude of pressure applied by a user on a portion of an electronic device when the user presses the portion of the electronic device can be used as the pressure sensor 240, and the type and the disposed location thereof may not be limited.

Also, the electronic device may include a haptic actuator (e.g., including circuitry to provide haptic feedback) 250 in the bottom of the pressure sensor.

Figure 3:
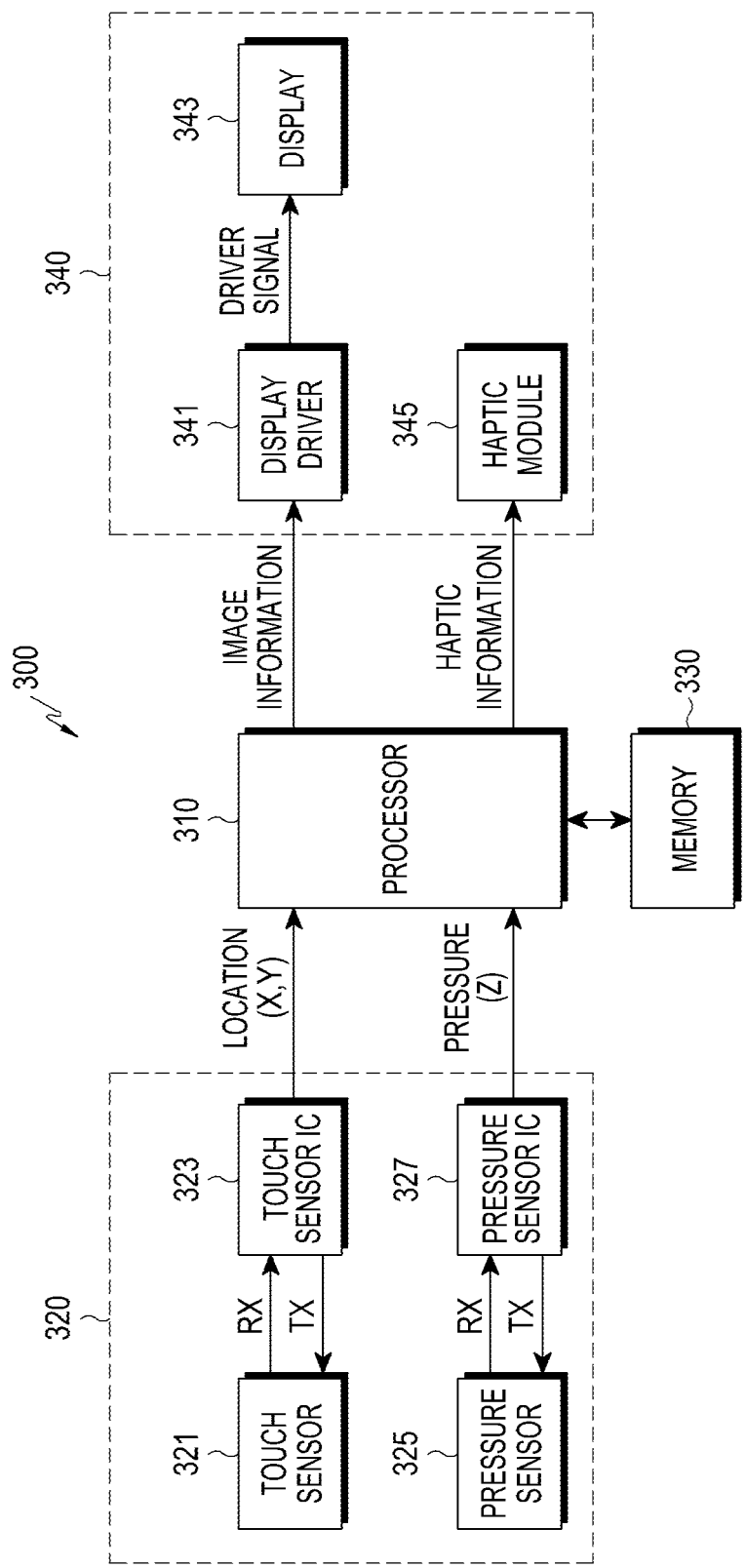
FIG. 3 is a block diagram illustrating an example of the configuration of an electronic device according to various example embodiments of the present disclosure.

FIG. 3 is a block diagram illustrating an example configuration of an electronic device according to various example embodiments of the present disclosure.

Referring to FIG. 3, according to various example embodiments of the present disclosure, an electronic device 300 (e.g., the same as or similar to the electronic device 101 of FIG. 1) may include a processor (e.g., including processing circuitry) 310, an input device (e.g., including input circuitry) 320, a memory 330, and an output device (e.g., including output circuitry) 340. Also, the electronic device 300 may further include a communication module (not illustrated).

According to various example embodiments of the present disclosure, the processor 310 (e.g., the same as or similar to the processor 120 of FIG. 1) may include various processing circuitry and process information generated as the electronic device 300 operates and information generated as programs, applications, or functions are executed.

According to various embodiments of the present disclosure, the processor 310 may perform control to display a layer, which displays a first user interface (UI) (e.g., a GUI) including at least one first item, on a display. Here, the layer may be the same as or similar to at least one of a screen, a window, a view, a surface, a canvas, and a page. Also, the first item, for example, may be the same as or similar to any one of an object, an application icon, a button icon, a document icon, a shortcut key, a widget, a menu, an indicator, and an instruction. Also, the first user interface may be, for example, a home screen that is initially displayed as an electronic device is booted up and operates after power is applied, an application screen displayed as a predetermined application (or function) is executed, or a screen-lock-state screen.

Figures 4A, 4B:
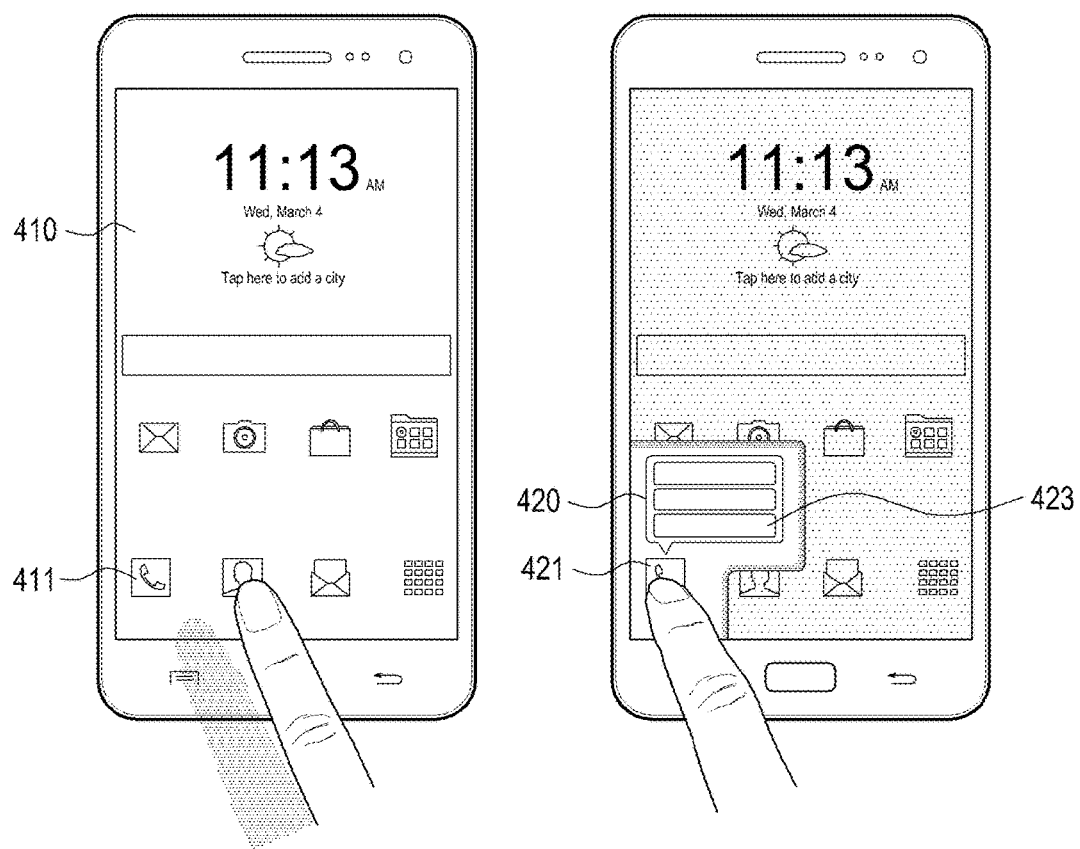
FIGS. 4A and 4B are diagrams illustrating examples of displaying user interfaces on a display of an electronic device according to various example embodiments of the present disclosure.

Also, according to various embodiments of the present disclosure, the processor 310 may perform a first function related to the first user interface. Here, the first function is a function executed before a touch input is received or a function executed in response to a touch input, and the first function may be a function related to a first user interface 410, as illustrated in FIG. 4A. When the first user interface is, for example, a graphic user interface for displaying a home screen, the first function may be at least one application program executed in connection with the home screen.

According to various embodiments of the present disclosure, when at least one first item (e.g., an icon 411 of FIG. 4A) displayed on a touchscreen of a display 343 is selected by a user, the processor 310 may receive a touch input sensed by at least one touch sensor 321. The processor 310 may sense pressure applied by an external medium (e.g., a user) using at least one pressure sensor 325. When a pressure signal is sensed by the at least one pressure sensor 325, the processor 310 may receive the sensed pressure signal, and may determine a pressure value (e.g., the intensity, level, or location of pressure) indicated by or included in the pressure signal. Also, the processor 310 may compare the determined pressure value with at least one set threshold value.

According to various embodiments of the present disclosure, when the pressure is sensed, the processor 310 may generate a second user interface (e.g., a second user interface 420 of FIG. 4B) including an icon related to a first item (e.g., an icon 421 of FIG. 4B) and at least one second item (a popup window 423 of FIG. 4B). The processor 310 may perform control to change a display property of a partial area related to the second item in the first user interface and the second user interface based on the pressure value indicated by the sensed pressure, and to perform display.

According to various embodiments, the processor 310 may display user interfaces (e.g., the first user interface and the second user interface) displayed on the display 343 in the form of a layer structure. Based on the direction in which the pressure is applied or the pressure value, the processor 310 may change the layering order of the first user interface and the second user interface, which are displayed on the touchscreen in the form of a layer structure. Also, the processor 310 may perform control to change a display property of an area neighboring an area in which the selected first item is displayed, in the first user interface or the second user interface, which is layered on top according to the changed layering order, and to perform display.

According to various embodiments of the present disclosure, when a pressure signal having a pressure value which is different from a pressure value indicated by or included in a previously sensed pressure signal is sensed, the processor 310 may perform control to change the display properties of user interfaces according to the pressure value included in the currently sensed pressure signal or the duration time of the pressure input, and to perform display. Here, the display property may include transparency, a color, a 3D effect, a bevel effect (the direction of a slope of an edge), an embossing effect (the thickness, angle, or curve of a slope of an edge), a movement effect, and various other display effects, between the neighboring area and the remaining area of the first or second user interface. Also, the display property may include at least one of a boundary line, a gradation, and a shadow for distinguishing the neighboring area from the remaining area of the user interface.

According to various embodiments of the present disclosure, the processor 310 may be a hardware module or a software module (e.g., an application program), which may be a hardware element (function) or a software element (program), or any combination thereof, including at least one of various sensors included in an electronic device, a data measuring module, an input/output interface, a module for managing a state or environment of an electronic device, and a communication module.

According to various embodiments of the present disclosure, the input device 320 of the electronic device (e.g., the same as or similar to the input/output interface 150 of FIG. 1) may include various input circuitry and transfer, to the processor 310, various pieces of information such as numbers and character information input from a user, various function settings, and signals which are input in connection with control of the functions of the electronic device 300. Also, the input device 320 may support a user input for executing a module or an application that supports a predetermined function. The input device 320 may include various input circuitry, such as, for example, and without limitation: a key input unit, such as a keyboard or a keypad; a touch input unit, such as a touch sensor 321 and a touch pad (including a touch sensor IC 323); a sound source input unit; a camera; and a sensor module (e.g., the pressure sensor 325 and a pressure sensor IC 327) including at least one of various sensors (e.g., the pressure sensor 325) or at least one sensor, and may include a gesture input unit including various gesture input circuitry. In addition, the input device 320 may include all types of input units which are being developed currently or will be developed in the future.

The touch input unit may receive a touch input signal (e.g., information associated with a touch location) sensed by the touch sensor 321, and the sensor module may receive a pressure input signal (e.g., the strength of pressure) sensed by the pressure sensor 325. Each of the touch input unit and the sensor module may transfer an input signal to the processor 310. Accordingly, the processor 310 may process an event corresponding to an input signal, and may output a processing result corresponding to the input signal through the display 343 or a haptic module 345 of the output device 340.

In the touch sensor 321, a designated physical quantity (e.g., voltage, the intensity of radiation, resistance, the quantity of electric charge, capacitance, or the like) may be changed by a touch by a user. According to an embodiment, the touch sensor 321 may be disposed to overlap the display 343.

The touch sensor IC 323 may sense a change in the physical quantity occurring in the touch sensor 321, and may calculate (determine) a location (X, Y) where a touch is provided, based on the change in the physical quantity (e.g., voltage, resistance, capacitance, or the like). The calculated (determined) location (coordinates) may be provided (or reported) to the processor 310. For example, when a body part of a user (e.g., a finger), an electronic pen, or the like is in contact with a cover glass (e.g., the diagram 210 of FIG. 2) of the display, a coupling voltage between a transmission end (Tx) and/or a reception end (Rx) included in the touch sensor 321 may change. For example, a change in the coupling voltage may be sensed by the touch sensor IC 323, and the touch sensor IC 323 may transfer, to the processor 310, the coordinates (X, Y) of the location where the touch is provided. Accordingly, the processor 310 may obtain data associated with the coordinates (X, Y) as an event associated with a user input.

The touch sensor IC 323 may be also referred to as a touch IC, a touchscreen IC, a touch controller, a touchscreen controller IC, or the like. According to an embodiment, in an electronic device that excludes the touch sensor IC 323, the processor 310 may execute the function of the touch sensor IC 323. According to an embodiment, the touch sensor IC 323 and the processor 310 may be embodied as a unitary (e.g., one-chip) configuration.

In the pressure sensor 325, pressure (or force) provided by an external object (e.g., a finger or an electronic pen) may be sensed. According to an embodiment, in the pressure sensor 325, a physical quantity (e.g., capacitance) between a transmission end (Tx) (e.g., an electrode) and a reception end (Rx) (e.g., an electrode) may be changed by a touch.

The pressure sensor IC 327 may sense a change in physical quantity (e.g., capacitance or the like) occurring in the pressure sensor 325, and may calculate (determine) pressure (Z) applied by the touch of a user based on the change in the physical quantity. Information about pressure (Z) and the location (X, Y) where the touch is provided may be provided to the processor 310. According to an embodiment, the pressure sensor IC 327 may be also referred to as a force touch controller, a force sensor IC, a pressure panel IC, or the like. Also, according to various embodiments, the touch sensor IC 327 and the touch sensor IC 323 may be embodied as a unitary (e.g., one-chip) configuration.

Also, according to various embodiments of the present disclosure, the input device 320 may receive, from a user, information input by the user through a touch panel or a camera of the display, and may transfer the input information to the processor 310. Also, according to various embodiments of the present disclosure, the input device 320 may receive an input signal associated with data to be transmitted to another electronic device, from a user through a sound source input unit (e.g., a microphone), and may transfer the input signal to the processor 310.

According to various embodiments of the present disclosure, the memory 330 (e.g., the memory 130 of FIG. 1) of the electronic device may temporarily store various data generated while a program is executed, in addition to a program that is required for performing a function according to various embodiments. The memory 330 may include a program area and a data area. The program area may store pieces of information related to driving of an electronic device such as an Operating System (OS) that boots an electronic device. The data area may store transmitted/received data and generated data according to various embodiments. Further, the memory 330 may include at least one storage medium selected from among a flash memory, a hard disk, a multimedia card micro type memory (e.g., an SD or XD memory), RAM, and ROM. According to various embodiments, the memory 330 may store information for communicating with an access point or another electronic device and transmitted and received data. The memory 330 may store instructions or data associated with operations of elements included in the electronic device 300. For example, the memory 330 may store at least one application program including a user interface configured to display a plurality of items on a display. Also, for example, upon execution, the memory 330 may store instructions which enable the processor 310 to perform various operations written in the present document.

According to various embodiments of the present disclosure, the output device 340 of the electronic device 300 may include various output circuitry, such as, for example, and without limitation, a display module (e.g., the same as or similar to the display 160 of FIG. 1) or an audio module (e.g., the same as or similar to the output interface 150 of FIG. 1). Here, the display module may include a display driver, for example, the display driving IC (DDI) 341, and the display 343 (e.g., a display panel). Also, according to various embodiments of the present disclosure, the output device 340 may further include a unit including circuitry for outputting a vibration (e.g., the haptic actuator or a haptic module 345) or a unit for outputting scent. The unit for outputting a vibration or the unit for outputting scent may output at least one of data transmitted/received through wireless data communication, the occurrence of a notification event associated with data transmission and reception, and information associated with a notification event that occurs, as a vibration or scent.

The driver (DDI) 341 may include circuitry to supply an image-driving signal corresponding to image information received from the processor 310 (host) to the display 343 at a predetermined frame rate. The display driving circuit 341 may drive the display 343 in a low-power mode. Although not illustrated, according to an embodiment, the display driving circuit 341 may include a graphic RAM, an interface module, an image-processing unit, a multiplexer, a display timing controller (T-con), a source driver, a gate driver, and/or an oscillator.

The display 343 may receive an image-driving signal supplied from the display driver (DDI) 341. The display 343 may display various contents and/or items (e.g., text, images (objects), videos, icons, function objects, or symbols) based on the image-driving signal. According to various embodiments, the display 343 may be overlappingly combined with the touch sensor 321 and/or pressure sensor 325, and may be referred to as a "display panel". The display 343 may operate in a low-power mode.

According to various embodiments of the present disclosure, a communication module of the electronic device (e.g., the same as or similar to the communication interface 170 of FIG. 1) may include various communication circuitry and perform communication with other devices on a wireless communication network under the control of the processor 310. According to various embodiments, the communication module may transmit to or receive from an access point, or another electronic device, data related to operations executed under the control of the processor 310. The communication module may perform communication through connection between devices or through connection to a network using wireless communication or wired communication through a communication interface. The wireless communication may include at least one of, for example, Wi-Fi, Bluetooth (BT), ZigBee, Z-Wave, Nearfield Communication (NFC), Global Positioning System (GPS), and cellular communication (e.g., LTE, LTE-A, CDMA, WCDMA, UMTS, WiBro, GSM or the like). The wired communication may include at least one of a Universal Serial Bus (USB), a High Definition Multimedia Interface (HDMI), Recommended Standard 232 (RS-232), a Plain Old Telephone Service (POTS), a Universal Asynchronous Receiver Transmitter (UART), an Inter-integrated Circuit (I2C), a Serial Peripheral Interface (SPI), and a Controller Area Network (CAN). Also, the communication module may include all types of communication schemes which have been widely known or will be developed in the future as well as the aforementioned communication schemes.

As described above, the electronic device according to various embodiments may activate a pressure sensor in the state in which a display is turned off. In the state in which the display is turned off, when the electronic device receives input using a touch sensor, there is a high probability that a malfunction not intended by a user may occur. Therefore, by receiving input using the pressure sensor in the state in which the display is turned off, the electronic device may reduce the unintended malfunction when receiving an input in the state in which the electronic device is in an idle state. Recently, interest in electronic devices that obviate physical keys to extend a display or to improve the design of the electronic device has increased. An electronic device may provide a user with the feeling as if the user were using a physical key by receiving input from the user using a pressure sensor while the electronic device is in an idle state. According to various embodiments, when pressure of a designated strength is sensed within a designated area, the electronic device may perform a function corresponding to the strength or the corresponding area.

As described above, various embodiments of the present disclosure have described various elements of an electronic disclosure through the electronic device of FIG. 3. However, the electronic device may include fewer or more elements compared with the elements of FIG. 3, since the elements of FIG. 3 are not prerequisite. Also, the locations of the major elements of the electronic device that have been described through FIG. 3 may be changeable according to various embodiments.

An electronic device according to any one of various example embodiments of the present disclosure may include: a housing including a first surface facing in a first direction and a second surface facing in a second direction opposite the first direction; a touchscreen display disposed between the first surface and the second surface, and exposed through the first surface; a pressure sensor disposed between the first surface and the second surface, and configured to detect pressure applied on the touchscreen display by an external object; at least one processor electrically connected to the touchscreen display, the pressure sensor, and a wireless communication circuit; and a memory electrically connected to the processor. The memory may include instructions which, when executed by the processor, cause the electronic device to perform: displaying a user interface including at least one item on the touchscreen display; receiving an input for selecting at least one item through the touchscreen display; sensing pressure applied to and/or around the at least one item on the display using the pressure sensor while the input is received; selecting a part of the user interface at least partially based on the input and the sensed pressure; and providing a visual effect on the user interface based on at least a part of the sensed pressure wherein the selected part of the user interface is displayed to appear concave compared with the remaining part of the user interface.

According to various example embodiments of the present disclosure, the processor may remove the visual effect at least partially based on the sensed pressure.

According to various example embodiments of the present disclosure, the processor may display a popup window and/or a menu, on and/or close to the at least one item, at least partially based on the sensed pressure, while the visual effect is provided.

According to various example embodiments of the present disclosure, the visual effect may include at least one of: a boundary line, a gradation, and a shadow for distinguishing the selected part of the user interface from the remaining part of the user interface.

According to various example embodiments of the present disclosure, the visual effect may include one or more of a transparency, sharpness, a color, or a 3D effect between the selected part and the remaining part of the user interface.

According to various example embodiments of the present disclosure, the visual effect may include a first level of transparency for the selected part and a second level of transparency for the remaining part of the user interface, and the first level may be greater than the second level.

According to various example embodiments of the present disclosure, the user interface may include the at least one item including icons indicating a home screen and an application program.

An electronic device according to any one of various example embodiments of the present disclosure may include: a housing including a first surface facing a first direction and a second surface facing a second direction opposite the first direction; a touchscreen display disposed between the first surface and the second surface, and exposed through the first surface; a pressure sensor disposed between the first surface and the second surface, and configured to detect pressure applied on the touchscreen display by an external object; at least one processor electrically connected to the touchscreen display, the pressure sensor, and a wireless communication circuit; and a memory electrically connected to the processor. The memory may be configured to store a first application program including a first user interface and a second application program including a second user interface, and the memory may include instructions which when executed by the processor cause the electronic device to perform: displaying the first user interface on the touchscreen display; receiving an input for providing at least one item through the first user interface; displaying the at least one item of the first user interface; sensing pressure applied to, and/or around, the at least one item on the display using the pressure sensor while the at least one item of the first user interface is displayed; and displaying the second user interface on the touchscreen display based on at least a part of the sensed pressure wherein the second user interface includes the at least one item.

According to various example embodiments of the present disclosure, the at least one item may include at least one of: text, a number, an image, a symbol, and a video.

According to various example embodiments of the present disclosure, the first application program may be configured to store and/or correct text; and the second application program may be configured to be used for communication with an external device.

An electronic device according to any one of various example embodiments of the present disclosure may include: a housing including a first surface facing a first direction and a second surface facing a second direction opposite the first direction; a touchscreen display disposed between the first surface and the second surface, and exposed through the first surface; a pressure sensor disposed between the first surface and the second surface, and configured to detect pressure applied from the outside; and at least one processor electrically connected to the touchscreen display and the pressure sensor. The processor is configured to perform: displaying a first user interface including at least one first item on the touchscreen display; sensing pressure applied by an external medium using the at least one pressure sensor upon reception of a touch input for the at least one first item, which is displayed on the touchscreen display; generating a second user interface including at least one second item, which is related to the first item, when the pressure is sensed; and changing a display property of the second item in the second user interface based on a pressure value indicated by the sensed pressure, and displaying the second item in the second user interface.

According to various example embodiments of the present disclosure, the processor may be configured to: change a layering order of the first user interface and the second user interface, which are displayed in a manner of being layered on the touchscreen, based on a direction in which the pressure is applied and/or a pressure value; change a display property of an area neighboring an area where the selected first item is displayed, in the first user interface or the second user interface whichever is layered on top based on the changed layering order; and display the same.

According to various example embodiments of the present disclosure, the display property may include one or more of a transparency, sharpness, a color, a 3D effect, a bevel effect (the direction of a slope of an edge), an embossing effect (the thickness, angle, and curve of a slope of an edge), a blur effect, or a movement effect between the neighboring area and the remaining part of the first or second user interface.

According to various example embodiments of the present disclosure, the display property may include at least one of: a boundary line, a gradation, and a shadow for distinguishing the neighboring area from the remaining part of the user interface.

Figure 5:
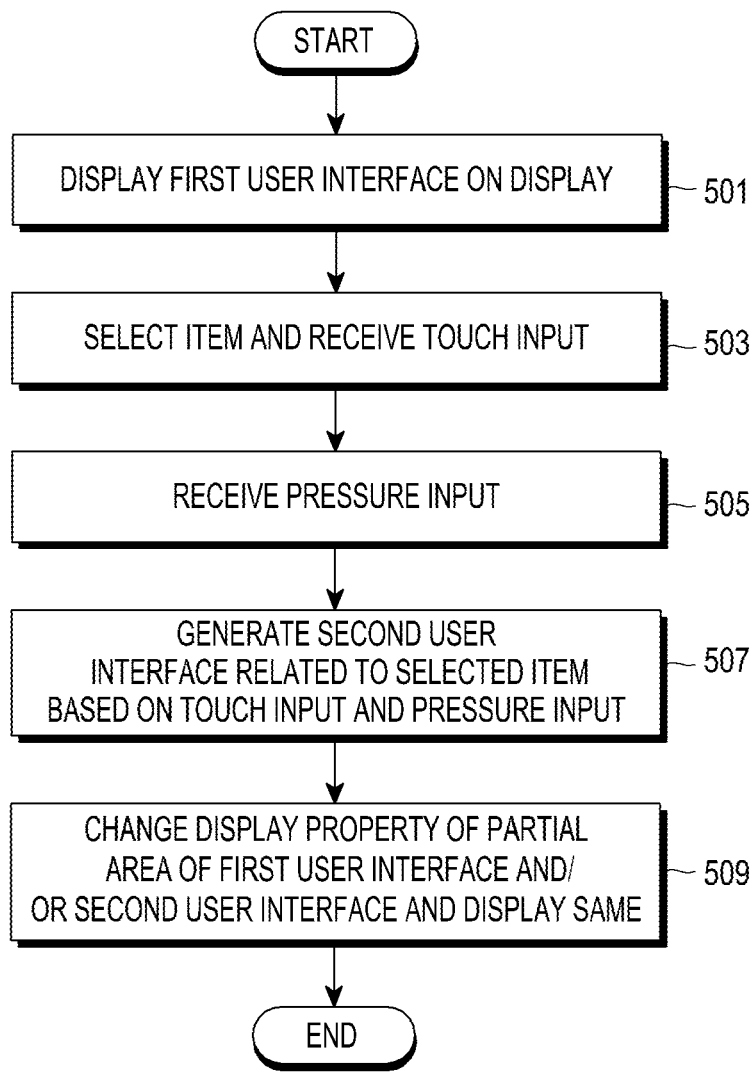
FIG. 5 is a flowchart illustrating an example operation procedure of an electronic device according to various example embodiments of the present disclosure.

FIG. 5 is a flowchart illustrating an example operation procedure of an electronic device according to various example embodiments of the present disclosure.

Referring to FIG. 5, an electronic device according to various embodiments of the present disclosure (the electronic device 101 of FIG. 1 or the electronic device 300 of FIG. 3) may display a first user interface (UI) (e.g., a GUI, a layer, a screen, a window, a view, a surface, a canvas, or a page) including at least one first item (e.g., at least one of an object, an application icon, a button icon, a document icon, a shortcut icon, a widget, a menu, an indicator, or an instruction) on a display in operation 501.

In operation 503, when at least one item included in the first user interface, displayed on a touchscreen, is selected by a user, the electronic device may receive a touch input which is sensed as the at least one item is selected, using at least one touch sensor (e.g., the touch sensor 220 of FIG. 2 or the touch sensor 321 of FIG. 3). Also, the electronic device may determine the coordinate values on the touchscreen of the display as the touch input is received, and may determine the location where the selected item is displayed.

In operation 505, while the electronic device receives the touch input as the at least one item is selected, the selected item may receive pressure input which is sensed by at least one pressure sensor.

In operation 507, the electronic device may generate a second user interface including an item (a second item) related to the selected item, based on the touch input and the pressure input.

In operation 509, the electronic device may perform display by changing a layer location or a display property of a part of the first user interface or the second user interface according to the touch input. Here, the second user interface (UI) (e.g., a GUI, a layer, a screen, a window, a view, a surface, a canvas, or a page) including the second item (e.g., at least one of an object, an application icon, a button icon, a document icon, a shortcut key, a widget, a menu, an indicator, and an instruction) may be displayed by being layered on the first user interface, or may be displayed by being disposed under the first user interface.

According to various embodiments of the present disclosure, the electronic device may display user interfaces (e.g., the first user interface and the second user interface) displayed on the display in the form of a layer structure or in the form of multiple screens. Here, the multi-screen form divides the screen of the display into areas corresponding to the number of activated functions or the number of user interfaces to be displayed, and displays corresponding user interfaces in the divided display areas.

According to various embodiments, when the user interfaces are displayed in the layer structure form, the electronic device may perform graphic-processing and generate a first user interface including at least one item, and may display the generated first user interface on a bottom layer (e.g., a background layer) of the display as a first layer. Also, in the state in which the first layer is displayed, when a sensed pressure signal is greater than or equal to a first threshold value, the electronic device activates a second function set for the sensed pressure signal, and performs graphic-processing and generates a second user interface associated with the activated second function. The electronic device may display the second user interface as a second layer by layering the second user interface on the first layer. Here, the electronic device may display at least one second item on a first display area of the second layer, and may display the second display area to be transparent such that a user is capable of identifying or selecting at least one displayed first item included in the first layer.

According to various embodiments, in the case in which user interfaces are displayed in the multi-screen form, when a sensed pressure signal is greater than or equal to a first threshold value in the state in which the first user interface is displayed on a display, the electronic device may divide the screen of the display based on the number of currently activated functions or the number of user interfaces to be displayed, and may distinguish the screen as multiple display areas. When the screen of the display is divided, the electronic device may display a first user interface on a first divided display area, and may display, in a second display area, a second user interface corresponding to a second function which is newly activated. Here, when an input signal greater than or equal to a second threshold value is sensed, the electronic device may generate or change the first user interface and the second user interface to be in sizes and display forms appropriate for corresponding display areas and display the same. Also, when configuring multiple screens, the electronic device may set a display start location (e.g., a pixel value) of a user interface to be displayed in each display area. For example, a first user interface, which is displayed in the state in which a pressure signal is less than a first threshold value, may be displayed in a full screen as the pixel value of screen coordinates (0, 0) is set as a start location. Also, for example, a first user interface, which is displayed in the state in which a pressure signal is greater than or equal to the first threshold value, may be displayed fully in the divided second display area as the pixel value of screen coordinates (0, 1280) is set as a start location.

Figure 6:
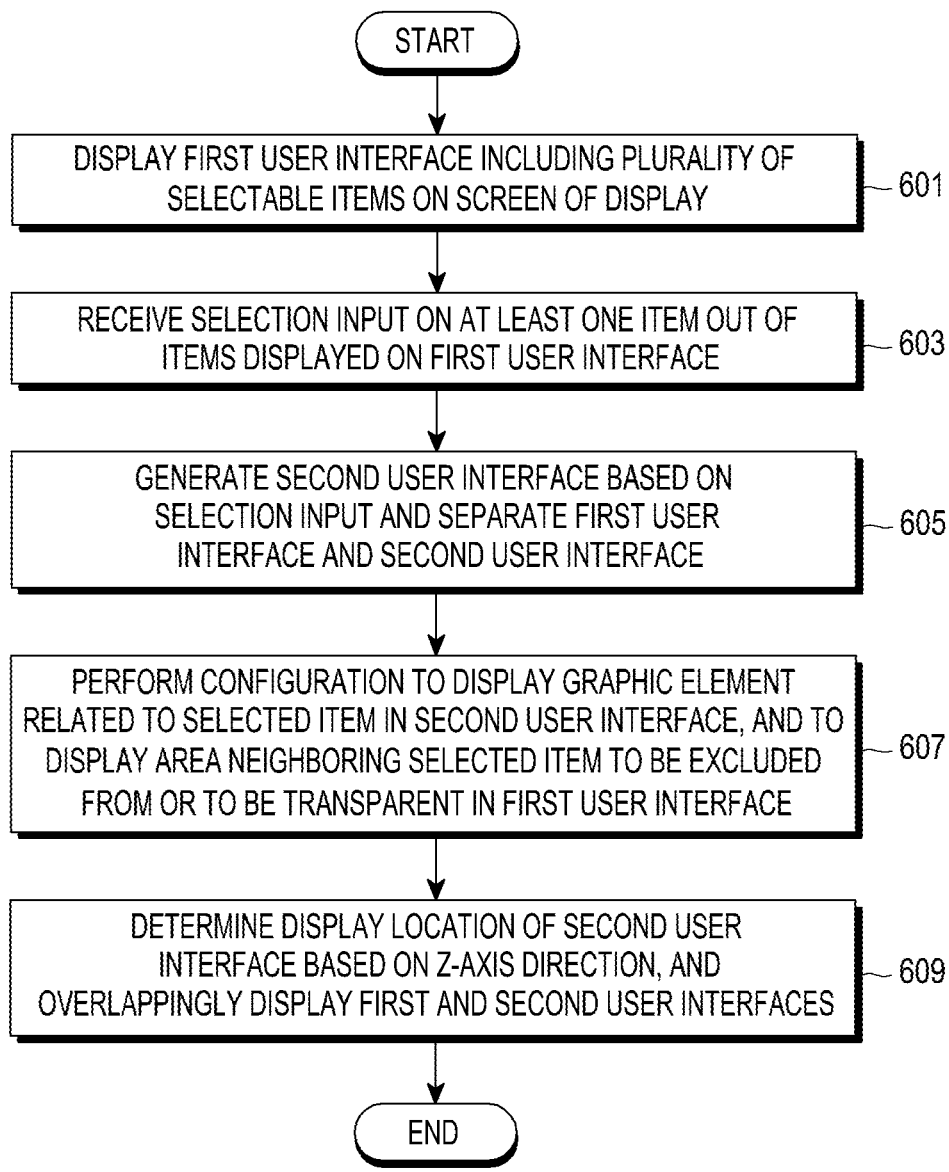
FIG. 6 is a flowchart illustrating an example operation procedure of an electronic device according to various example embodiments of the present disclosure.

FIG. 6 is a flowchart illustrating an example operation procedure of an electronic device according to various example embodiments of the present disclosure.

Referring to FIG. 6, an electronic device according to various embodiments of the present disclosure (e.g., the electronic device 101 of FIG. 1 or the electronic device 300 of FIG. 3) may display a user interface (e.g., a layer) including a plurality of selectable items on a screen (e.g., a touchscreen) of a display in operation 601. According to various embodiments, the user interface may be displayed as a first user interface on the entire area of the screen of the display. In operation 603, the electronic device may receive, for example, from a user, a selection input (or input signal) for selecting at least one item out of the items displayed on the first user interface of the screen. Here, the received selection input may include a touch input (an X axis and a Y axis) and a pressure input (Z axis).

In operation 605, in response to the reception of the selection input, the electronic device may generate a second user interface (e.g., a GUI) based on the selection input, and may separate the first user interface and the second user interface, which are to be displayed on the screen in a layer structure.

In operation 607, the electronic device may perform configuration to display a graphic element (e.g., an item corresponding to the selected icon and an image or popup window that displays related information) related to the selected item in the second user interface. According to various embodiments, the electronic device may set an area neighboring the selected item to be transparent or may set or reconfigure the first user interface such that the area neighboring the selected item is excluded from display.

In operation 609, the electronic device determines the display location of the generated second user interface to be the top or bottom based on the z-axis direction, may dispose the separated second user interface at the top or bottom in the z-axis direction of the first user interface such that the interfaces overlap each other, according to the determined result, and may display the same.

According to various embodiments, the electronic device may display a user interface disposed on top (e.g., the first user interface) in different transparencies based on touch coordinates of the x-axis and the y-axis. For example, the transparency of an area neighboring the selected coordinates of the item is set to be high, and the transparency of the remaining area is set to be low for display.

FIGS. 7A, 7B, 7C and 7D are diagrams illustrating examples of displaying user interfaces on a display of an electronic device according to various example embodiments of the present disclosure.

Figure 7A:
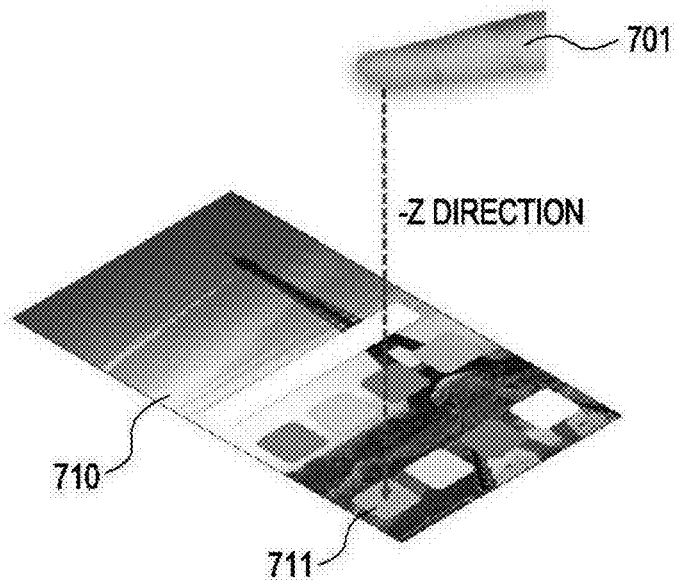
FIGS. 7A, 7B, 7C and 7D are diagrams illustrating examples of displaying user interfaces on a display of an electronic device according to various example embodiments of the present disclosure.

Referring to FIG. 7A, the electronic device may display a first user interface 710 including at least one selectable item. Here, the first user interface 710 may be displayed as a first layer, which may be layered on a basic layer of a touchscreen of a display. Also, when at least one item 711 included in the first user interface 710 is selected, the electronic device may determine the location where a touch is applied on the touchscreen, that is, a display location (e.g., the coordinates (X, Y) on a touchscreen) where the selected item 711 is located, based on a touch input received based on the selection. The electronic device may receive a pressure input 701 applied in the Z direction (e.g., the –Z direction) at the determined display location while the touch input is received.

Figure 7B:
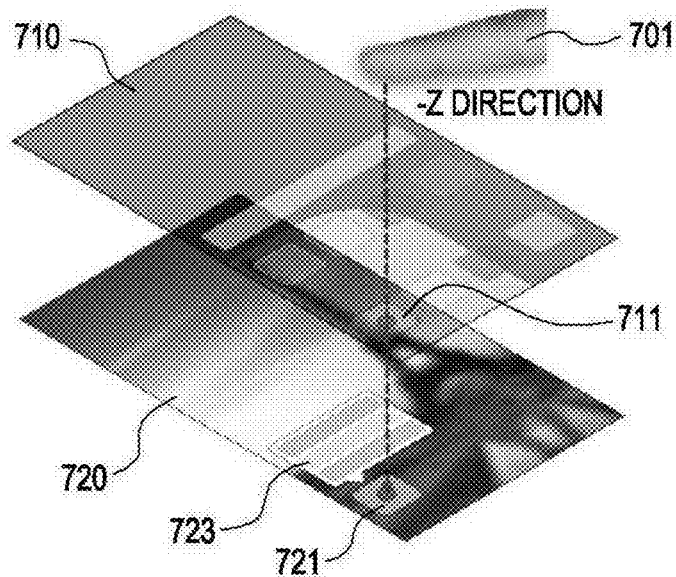

Referring to FIG. 7B, in the state illustrated in FIG. 7A, the electronic device may determine a pressure value and a pressure direction of the received pressure input 701, and may generate a second user interface 720 based on the pressure value. Here, the second user interface 720 may include an item 721, which is the same as or similar to the selected item, and at least one item 723 which shows information associated with the selected item.

The direction in which the pressure is applied is the –Z direction (e.g., the direction in which pressure is applied from the top to the bottom), and the generated second user interface is displayed in a first layer located at the bottom, and the first user interface 710 is displayed in a second layer, which is layered on top of the second user interface 720. In this instance, the electronic device processes a first display area corresponding to a predetermined range of a display area where items 721 and 723 of the second user interface 720 are displayed, to be transparent in the first user interface located on the top, changes a display property of the remaining display area to be different from that of the first display area (e.g., processing the remaining display area to be translucent), and displays the same. Also, when the items 721 and 723 of the second user interface 720 are shown through the transparency processing of the first user interface 710, the electronic device may change a display property to provide a visual effect which shows the items 721 and 723 of the second user interface 720 appearing in a concave form.

Figure 7C:
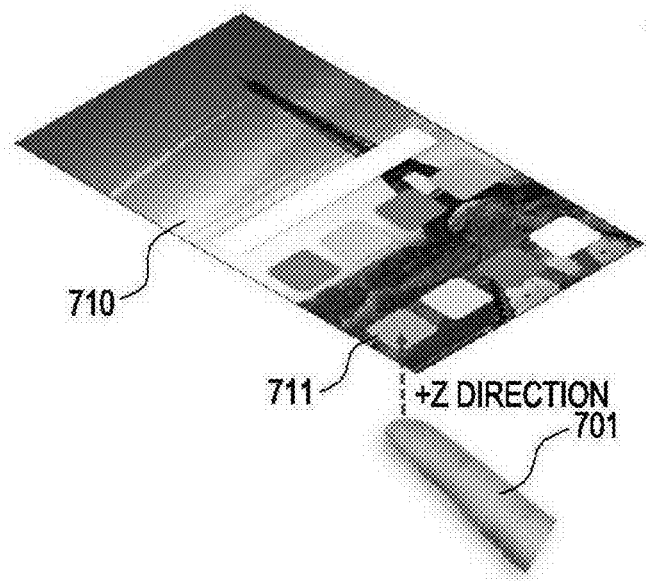

Referring to FIG. 7C, the electronic device may display the first user interface 710 including at least one selectable item. Here, the first user interface 710 may be displayed in a first layer, which may be layered on the basic layer of the touchscreen of the display. Also, when at least one item 711 included in the first user interface 710 is selected, the electronic device may determine the location where a touch is applied on the touchscreen, that is, a display location (e.g., the coordinates (X, Y) of a touchscreen) where the selected item 711 is located, based on a touch input received based on the selection. The electronic device may receive a pressure input 701 applied in the Z direction (e.g., the +Z direction) at the determined display location while the touch input is received. For example, the electronic device may sense the touch input on the touchscreen, and may sense a touch input received on a second surface of a housing during a predetermined period of time. Also, the electronic device may sense a touch input, inputted by another finger, on the second surface of the housing, while sensing a touch input on the touchscreen.

Figure 7D:
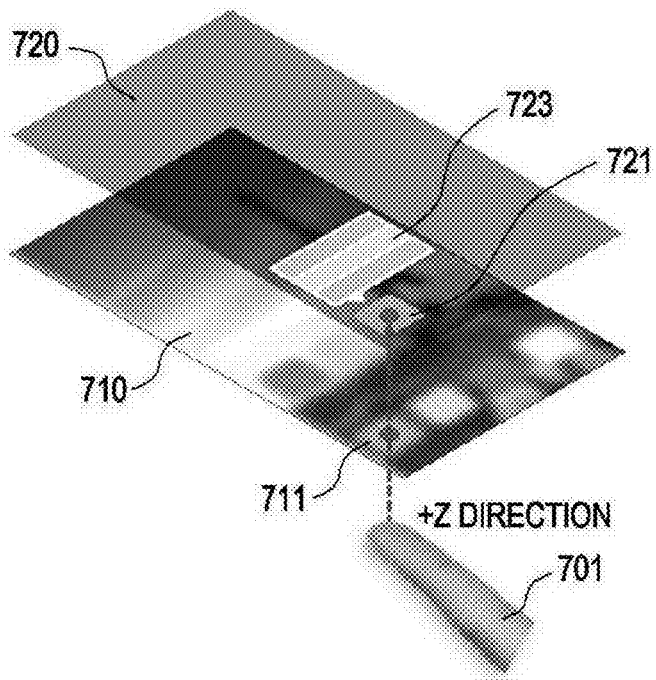

Referring to FIG. 7D, in the state illustrated in FIG. 7C, the electronic device may determine a pressure value and a pressure direction of a received pressure input 701, and may generate the second user interface 720 based on the pressure value. Here, the second user interface 720 may include the item 721, which is the same as or similar to the selected item, and the at least one item 723 which shows information associated with the selected item.

The direction in which the pressure is applied is the +Z direction (e.g., the direction in which pressure is applied from the bottom to the top), and the generated second user interface is displayed in a second layer, which is located on top of the first user interface 710, and the first user interface 710 is displayed in a first layer. In this instance, the electronic device processes a predetermined range of a display area where the items 721 and 723 of the second user interface 720 are displayed, to be opaque, changes a display property of the remaining display area (e.g., processing the remaining display area to be transparent or translucent) to be different from that of a display area corresponding to a predetermined range of a display area where items 721 and 723 of the second user interface 720 are displayed, and displays the same. Also, when the items 721 and 723 of the second user interface 720 are shown by being superimposed on the first user interface 710, the electronic device may change the display property to provide a visual effect which shows the items 721 and 723 of the second user interface 720 appearing in a convex form.

FIGS. 8A, 8B, 8C, 8D and FIG. 9 are diagrams illustrating examples of displaying user interfaces on a display of an electronic device according to various example embodiments of the present disclosure.

Figure 8A:
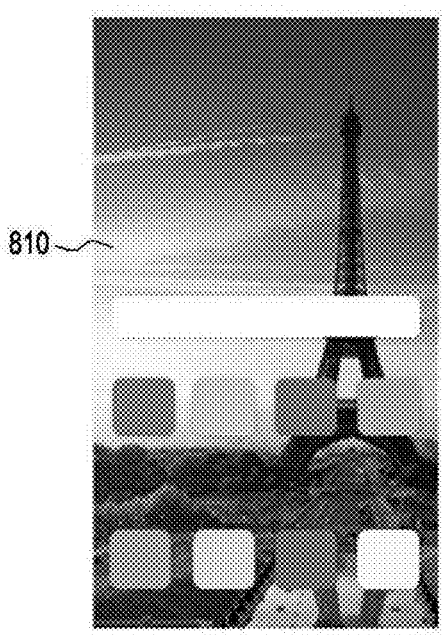
FIGS. 8A, 8B, 8C and 8D are diagrams illustrating examples of displaying user interfaces on a display of an electronic device according to various example embodiments of the present disclosure.
Figure 8B:
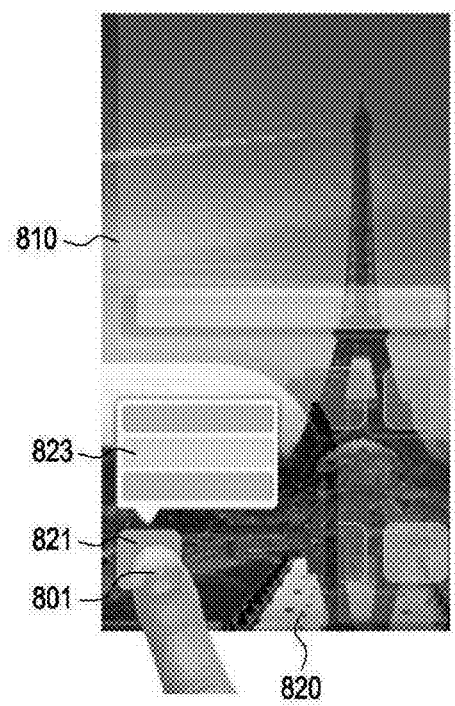
Figure 8C:
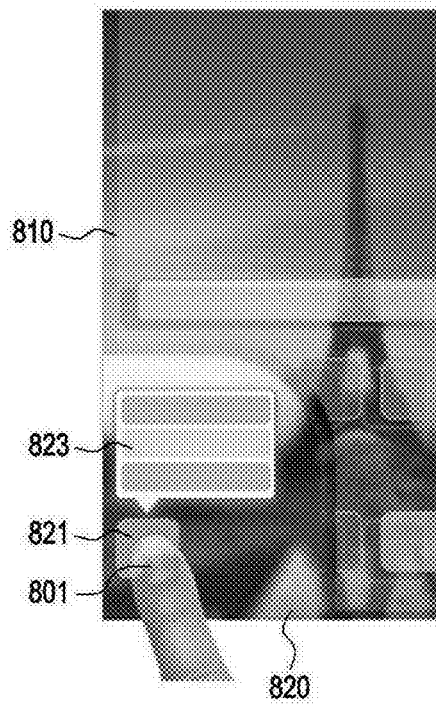
Figure 8D:
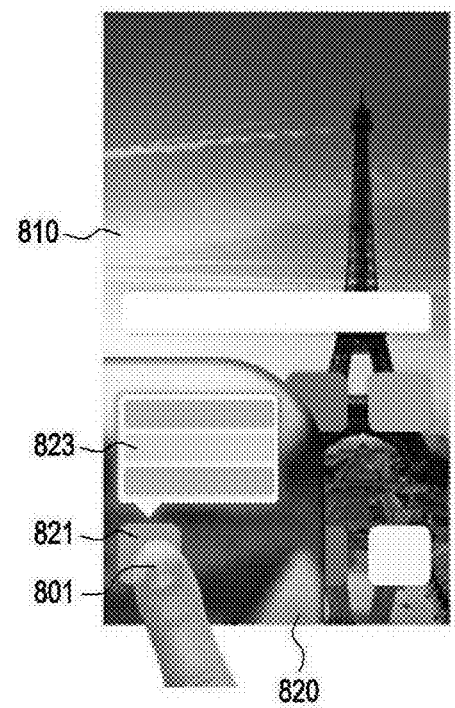

Referring to FIGS. 8A, 8B, 8C and 8D, an electronic device receives a touch input when at least one item is selected by a finger 801 in the state in which a first user interface 810 is displayed, and displays a second user interface 820 including an item 821 that is the same as or similar to the selected item and an item 823 related to the selected item, under the first user interface 810 according to a pressure value of a pressure input received at the touch location. Also, the electronic device may process a partial area (a first display area) of the first user interface to be transparent so that the item 821 and the item 823 related to the selected item, which are included in the second user interface 820, are shown, as illustrated in FIG. 8B. Also, as illustrated in FIGS. 8B, 8C and 8D, when the pressure input by the finger 801 is maintained or when the intensity of the pressure increases, the electronic device may process the transparency of the remaining display area excluding the first display area to be gradually increased, and may display the first display area.

Figure 9:
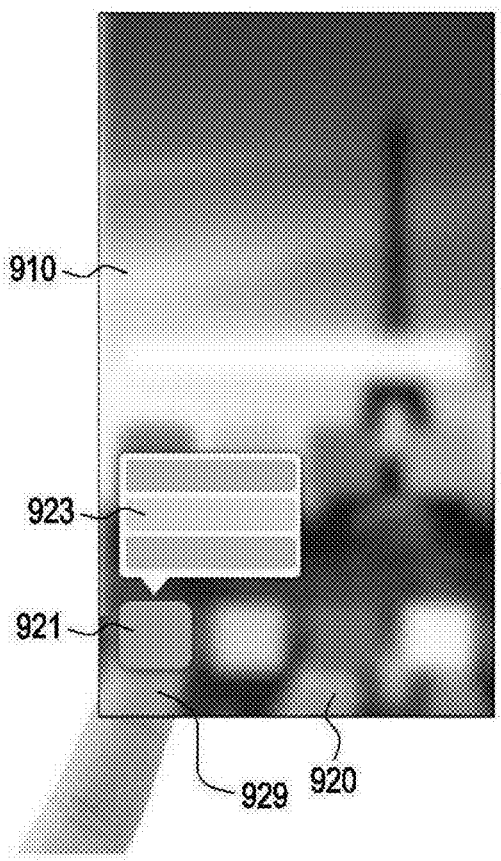
FIG. 9 is a diagram illustrating an example of displaying user interfaces on a display of an electronic device according to various example embodiments of the present disclosure.

Referring to FIG. 9, when pressure is applied in the +Z direction, the electronic device may process an area where items 921 and 923 are displayed in a second user interface 920 or a neighboring area to be opaque so as to display the same, and may process the remaining area to be transparent or translucent and may overlappingly display items disposed on an area of a first user interface 910 corresponding to the remaining area. Also, the electronic device may display the area of the first interface 910 to have a blur effect (e.g., blur processing).

Figure 10:
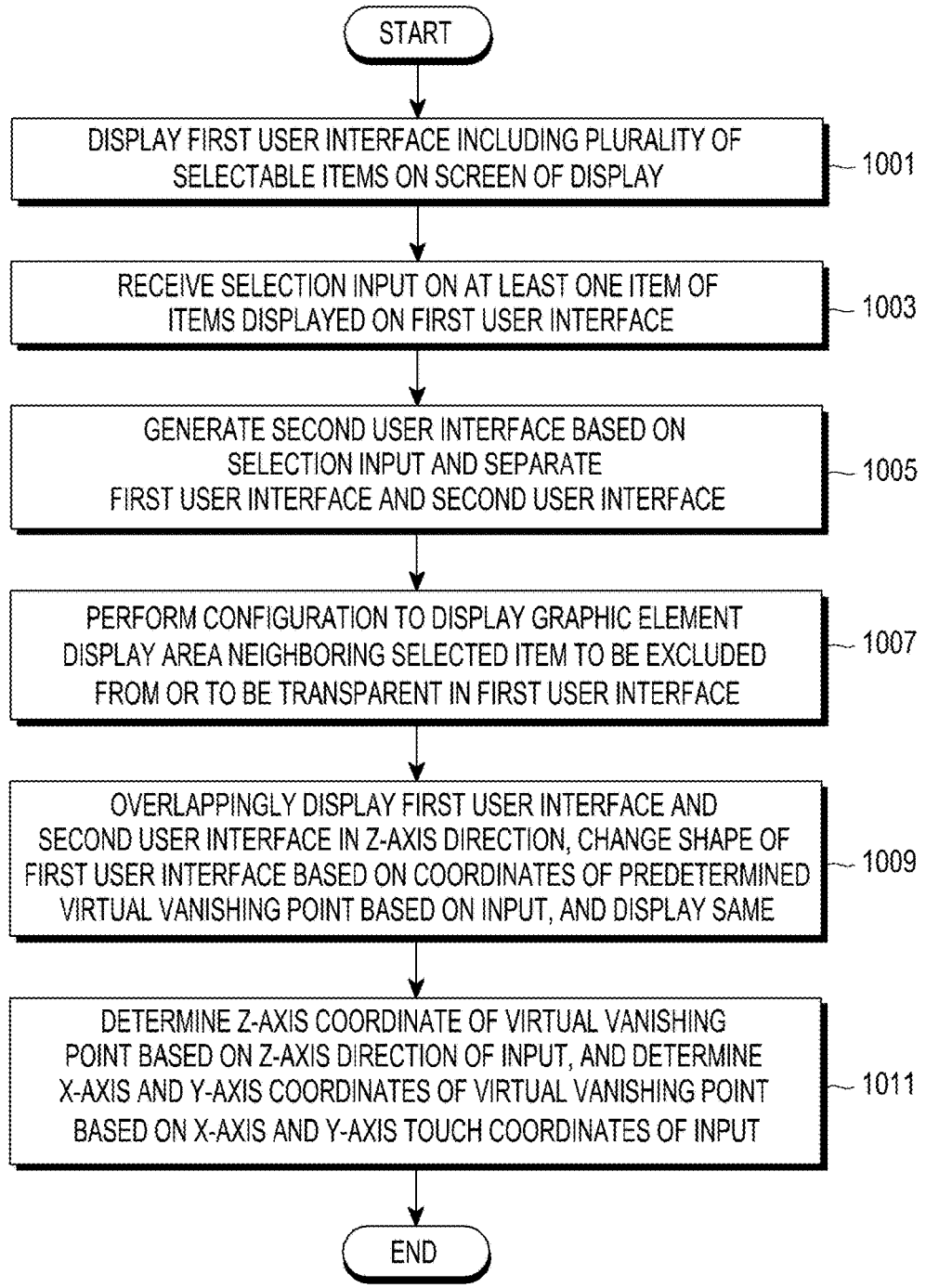
FIG. 10 is a flowchart illustrating an example operation procedure of an electronic device according to various example embodiments of the present disclosure.

FIG. 10 is a flowchart illustrating an example operation procedure of an electronic device according to various example embodiments of the present disclosure.

Referring to FIG. 10, an electronic device according to various embodiments of the present disclosure (e.g., the electronic device 101 of FIG. 1 or the electronic device 300 of FIG. 3) may display a user interface (e.g., a layer) including a plurality of selectable items on a screen (e.g., a touchscreen) of a display in operation 1001. According to various embodiments, the user interface may be displayed, as a first user interface, on the entire area of the screen of the display. In operation 1003, the electronic device may receive, from a user, a selection input (or an input signal) for selecting at least one item of the items displayed on the first user interface of the screen. Here, the received selection input may include a touch input (an X axis and a Y axis) and a pressure input (Z axis).

In operation 1005, in response to the reception of the selection input, the electronic device may generate a second user interface (e.g., a GUI) based on the selection input, and may separate the first user interface and the second user interface, which are to be displayed on the screen in a layer structure.

In operation 1007, the electronic device may perform configuration to display a graphic element (e.g., an item corresponding to the selected icon and an image or popup window that displays related information) related to the selected item in the second user interface. According to various embodiments, the electronic device may set an area neighboring the selected item to be transparent, or may set or reconfigure the first user interface such that the area neighboring the selected item is excluded from display.

In operation 1009, the electronic device determines the display location of the generated second user interface to be the top or bottom based on the z-axis direction, may dispose the separated second user interface in the z-axis direction of the first user interface on the top or bottom such that the interfaces overlap each other, according to the determined result, and may display the same. According to various embodiments, the electronic device may display the first user interface by changing the shape of the first user interface based on the coordinates of a predetermined virtual vanishing point based on an input.

In operation 1011, the electronic device determines a z-axis coordinate of the virtual vanishing point based on the z-axis direction of the input, and determines the x-axis and y-axis coordinates of the virtual vanishing point based on the x-axis and y-axis touch coordinates of the input.

Figure 11A:
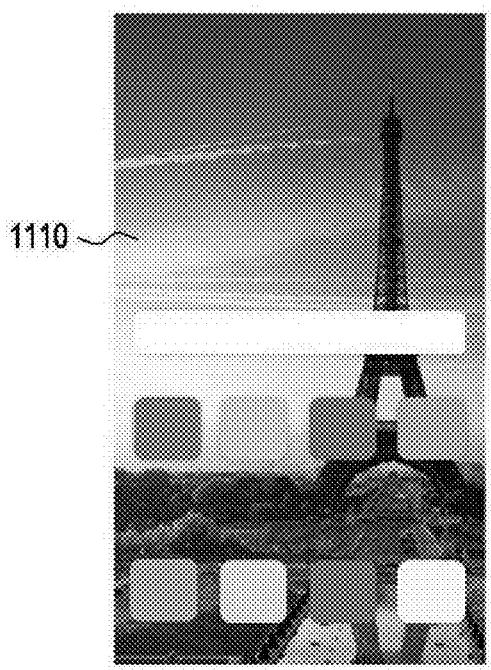
FIGS. 11A and 11B are diagrams illustrating examples of displaying user interfaces on a display of an electronic device according to various example embodiments of the present disclosure.
Figure 11B:
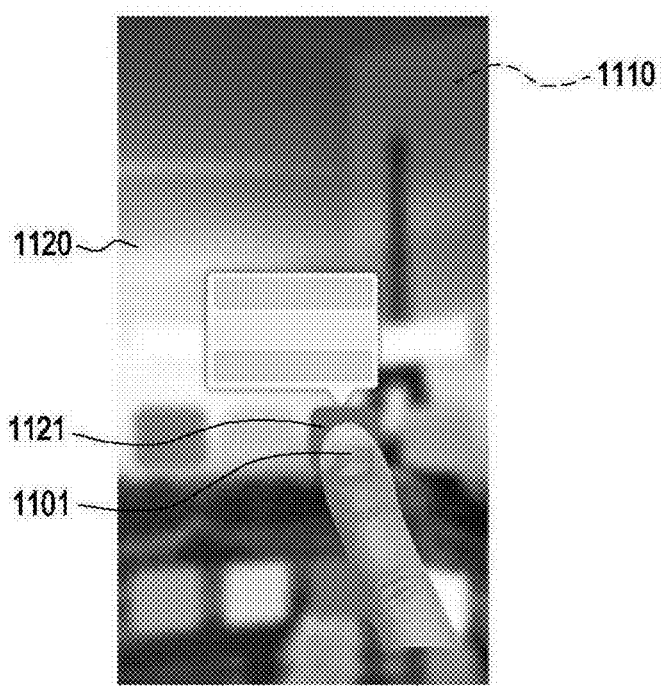

FIGS. 11A and 11B are diagrams illustrating examples of displaying user interfaces on a display of an electronic device according to various example embodiments of the present disclosure.

Referring to FIGS. 11A and 11B, the electronic device may display a first user interface 1110 including at least one first item, and may receive, from a user, a touch input indicating x-axis and y-axis touch coordinates and a pressure input including a downward z-axis pressure.

As illustrated in FIG. 11B, the electronic device may change a display property of a first user interface 1110 based on the coordinates of a predetermined virtual vanishing point based on the pressure input, and may display the changed first user interface 1120. The electronic device may determine, for example, the z-axis coordinate of a virtual vanishing point on an area 1121 where pressure is applied by a finger 1101, based on the z-axis direction of the input, and may determine the x-axis and y-axis coordinates of the virtual vanishing point based on the x-axis and y-axis touch coordinates of the input by the pressure. Here, the first user interface 1120 may provide a visual effect of moving inside based on the determined vanishing point.

Figure 12A:
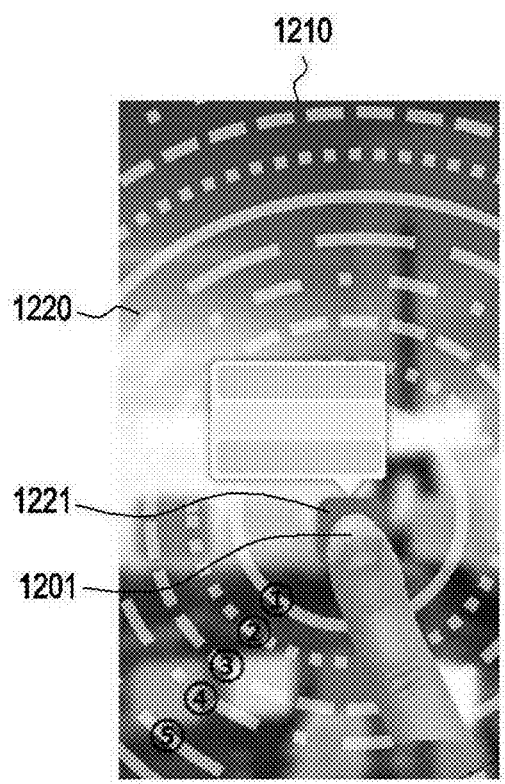
FIGS. 12A and 12B are diagrams illustrating examples of displaying user interfaces on a display of an electronic device according to various example embodiments of the present disclosure.
Figure 12B:
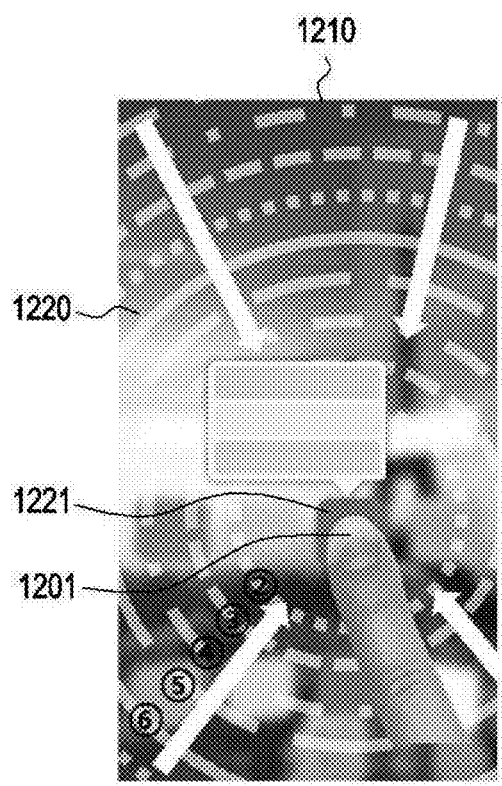

FIGS. 12A and 12B are diagrams illustrating examples of displaying user interfaces on a display of an electronic device according to various example embodiments of the present disclosure.

Referring to FIGS. 12A and 12B, in the state in which first and second user interfaces are displayed on a current touchscreen as illustrated in FIG. 8B, the electronic device may display a first user interface 1210 to include a predetermined animation effect such as motion blur, a wave effect, or the like based on a received touch input and pressure input on a selected item 1221. The predetermined animation effect may provide movement based on the pressure input.

As illustrated in FIG. 12A, the electronic device may display virtual motion objects (or effect objects) (e.g., □ to ⑤) such that the virtual motion objects appear around a predetermined virtual point 1201 related to the pressure input. Also, as illustrated in FIG. 12B, the electronic device may display an effect in which □ moves in the direction toward the virtual point 1201 while the pressure input continues, and then disappears, □ moves in the direction toward □, and □ moves in the direction toward □, or a new effect □ is newly generated and moves from the screen edge to the direction toward □. That is, the electronic device may display the effects such that the effects move in the direction toward the input-based virtual point 1201. Here, the electronic device may determine the z-axis coordinate of the virtual vanishing point 1201 based on the z-axis direction of the pressure input, and may determine the x-axis and y-axis coordinates of the virtual vanishing point based on the x-axis and y-axis touch coordinates of the input.

According to various embodiments, the electronic device may determine the speed and the duration time for displaying an effect, which moves based on the duration time of the input. As another example, the electronic device may determine a display duration time of the second user interface 1220 based on the duration time of the input. As another example, the electronic device may determine the size of the second user interface 1220 or the amount of information (items) included in the second user interface 1220 based on the duration time of the input.

FIGS. 13A, 13B, 13C and 13D are diagrams illustrating examples of displaying user interfaces on a display of an electronic device according to various example embodiments of the present disclosure.

Referring to FIGS. 13A, 13B, 13C and 13D, an electronic device according to various embodiments of the present disclosure separates layers of a touchscreen based on a z-axis pressure input, changes the locations of the layers or changes a display property of a user interface of each layer based on the intensity of the pressure, and performs display.

Figures 13A, 13B:
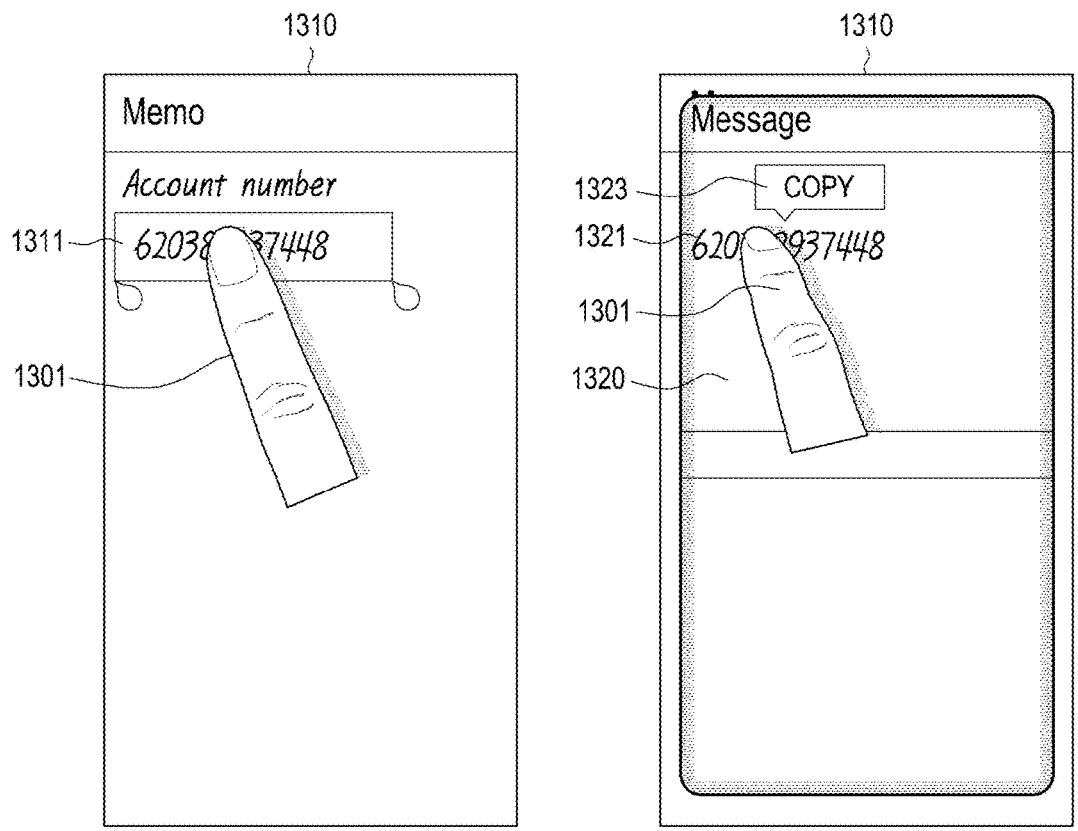
FIGS. 13A, 13B, 13C and 13D are diagrams illustrating examples of displaying user interfaces on a display of an electronic device according to various example embodiments of the present disclosure.

As illustrated in FIG. 13A, the electronic device may display a first user interface 1310 related to a first function (e.g., a memo function), and may receive touch input on an item 1311 selected as at least one item included in the first user interface 1310 is selected by a user. In this instance, the electronic device may determine the location (screen coordinates) where the selected item 1311 is displayed based on the received touch input. Also, the electronic device may receive pressure input sensed using at least one pressure sensor since pressure may be applied as touch input is provided, and may determine a pressure value 1331 indicated by the received pressure input.

Also, the electronic device may receive a pressure signal indicating that pressure applied by the hand (e.g., finger) 1301 of a user is sensed at the determined location, and may determine a pressure value of the pressure signal of the sensed pressure, as illustrated in FIG. 13B. The electronic device may determine that the currently sensed pressure value (F) 1333 is greater than or equal to a first threshold value (L1) and less than a second threshold value (L2).

As the electronic device determines that the currently sensed input value 1333 is greater than the previous pressure value 1331, the electronic device may copy the selected item 1311 and perform a second function (e.g., a message function) for pasting the copied item 1311. Also, the electronic device may display a second user interface 1320 related to the second function in a manner of overlapping the first user interface 1310. According to various embodiments, the electronic device displays the first user interface 1310 on top, or displays some of the first user interface 1310 to be transparent, and may display the second user interface 1320 displaying a 'copy indicator' 1323 and a 'text indicator (620382937448)' 1321, which are generated in response to the input, under the first user interface 1310 to overlap each other. Also, according to various embodiments, the electronic device may display items displayed on the second user interface (message app) related to the currently executed second function to be projected onto an area of the first user interface 1310.

Figures 13C, 13D:
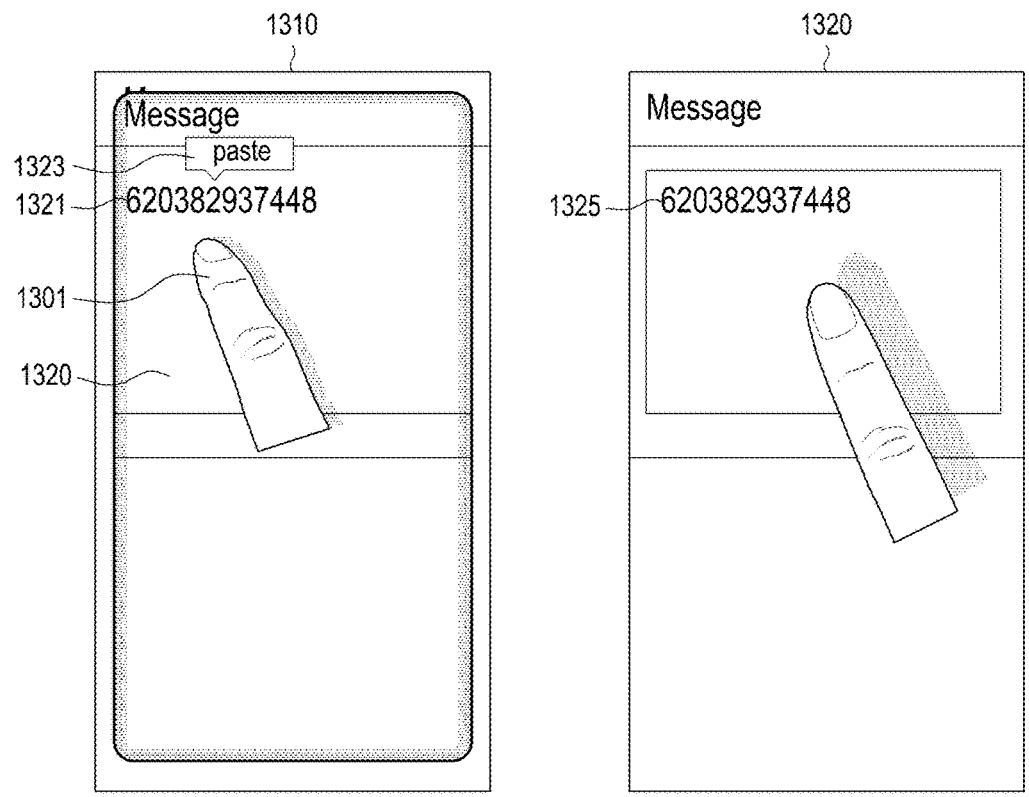

Referring to FIG. 13C, the electronic device may receive pressure input as higher pressure is applied, and may determine the pressure value 1335 of the received pressure input. The electronic device may determine that the currently sensed pressure value (F) 1335 is greater than or equal to a second threshold value (L2). In this instance, the electronic device may display data 1325 related to the text data 1321 on the second user interface 1320. When a z-axis pressure input 1337 is released, the electronic device processes the first user interface 1310 as a background, and may display the second user interface 1320 on top as illustrated in FIG. 13D.

FIGS. 14A, 14B, 14C and 14D are diagrams illustrating examples of displaying user interfaces on a display of an electronic device according to various example embodiments of the present disclosure.

Referring to FIGS. 14A, 14B, 14C and 14D, an electronic device according to various embodiments of the present disclosure may change display properties and layer display locations of user interfaces of the layers, which are displayed when a function of copying and pasting text data 1411 is performed, by using the separation of the layers displayed on a touchscreen based on a z-axis pressure input, and may display the same.

Figure 14A:
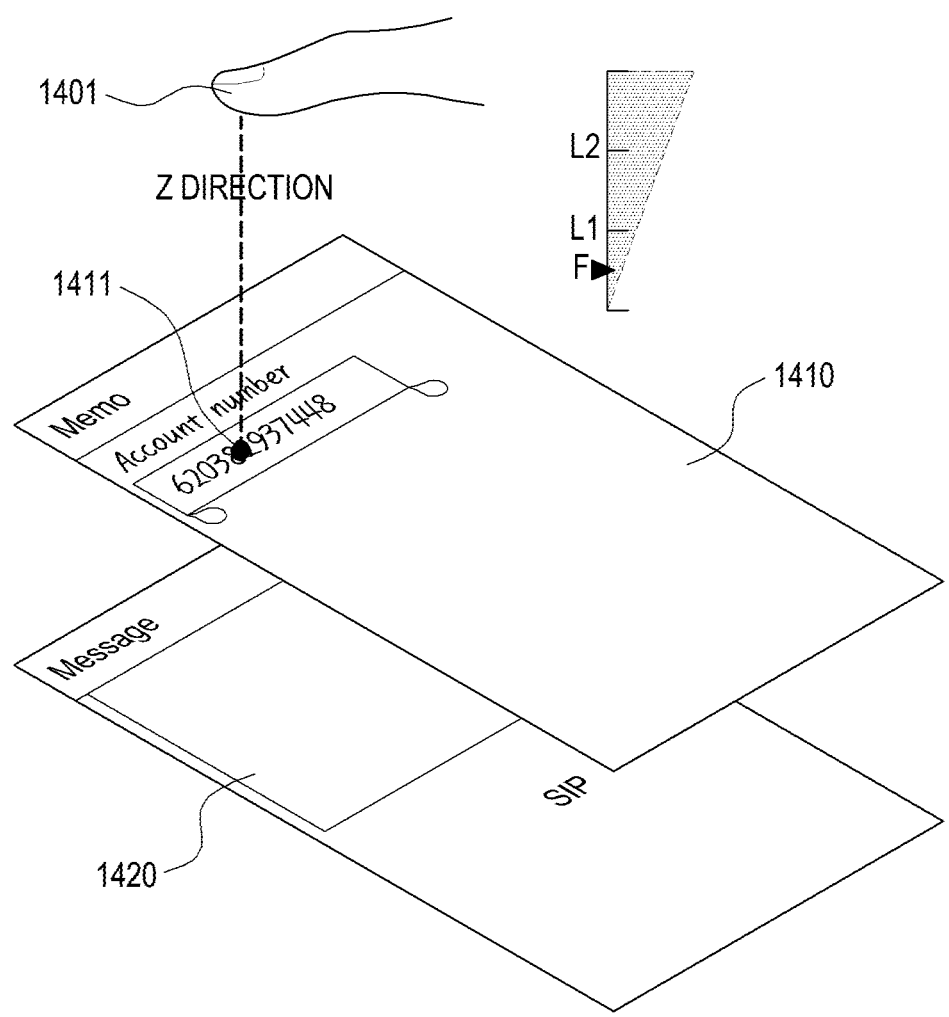
FIGS. 14A, 14B, 14C and 14D are diagrams illustrating examples of displaying user interfaces on a display of an electronic device according to various example embodiments of the present disclosure.

Referring to FIG. 14A, the electronic device may display a first user interface 1410 on top, and may execute a second user interface 1420 as a background. When at least one item is selected, the electronic device may receive a touch input on the selected item (text) 1411. When pressure input 1401 received while the touch input is received is less than a first threshold value (L1), the electronic device may separate the first user interface 1410 and the second user interface 1420, may display the first user interface 1410 on top, and may set a partial area of the first user interface 1410 to be transparent.

Figure 14B:
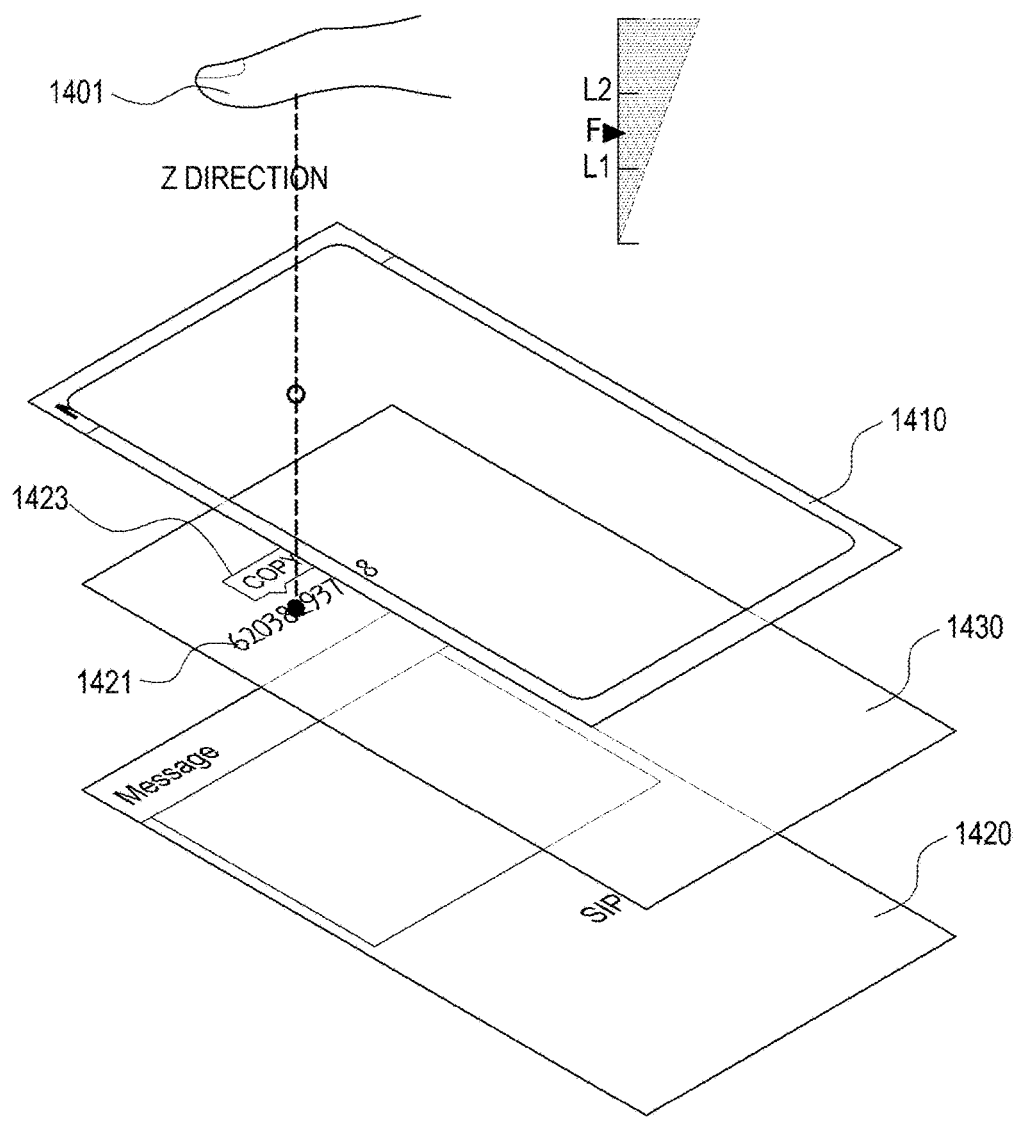

Referring to FIG. 14B, the electronic device may display a third user interface 1430 including a 'copy indicator' 1423 and a 'text indicator (620382937448)' 1421, which are generated in response to the pressure input 1401, under the first user interface 1410. Also, the electronic device may display the second user interface 1420 related to an application (e.g., a message app) which is currently displayed as a background under the first user interface 1410, to be projected onto the first user interface 1410 and the third user interface 1430, whereby the second user interface 1420 are shown through them.

Figure 14C:
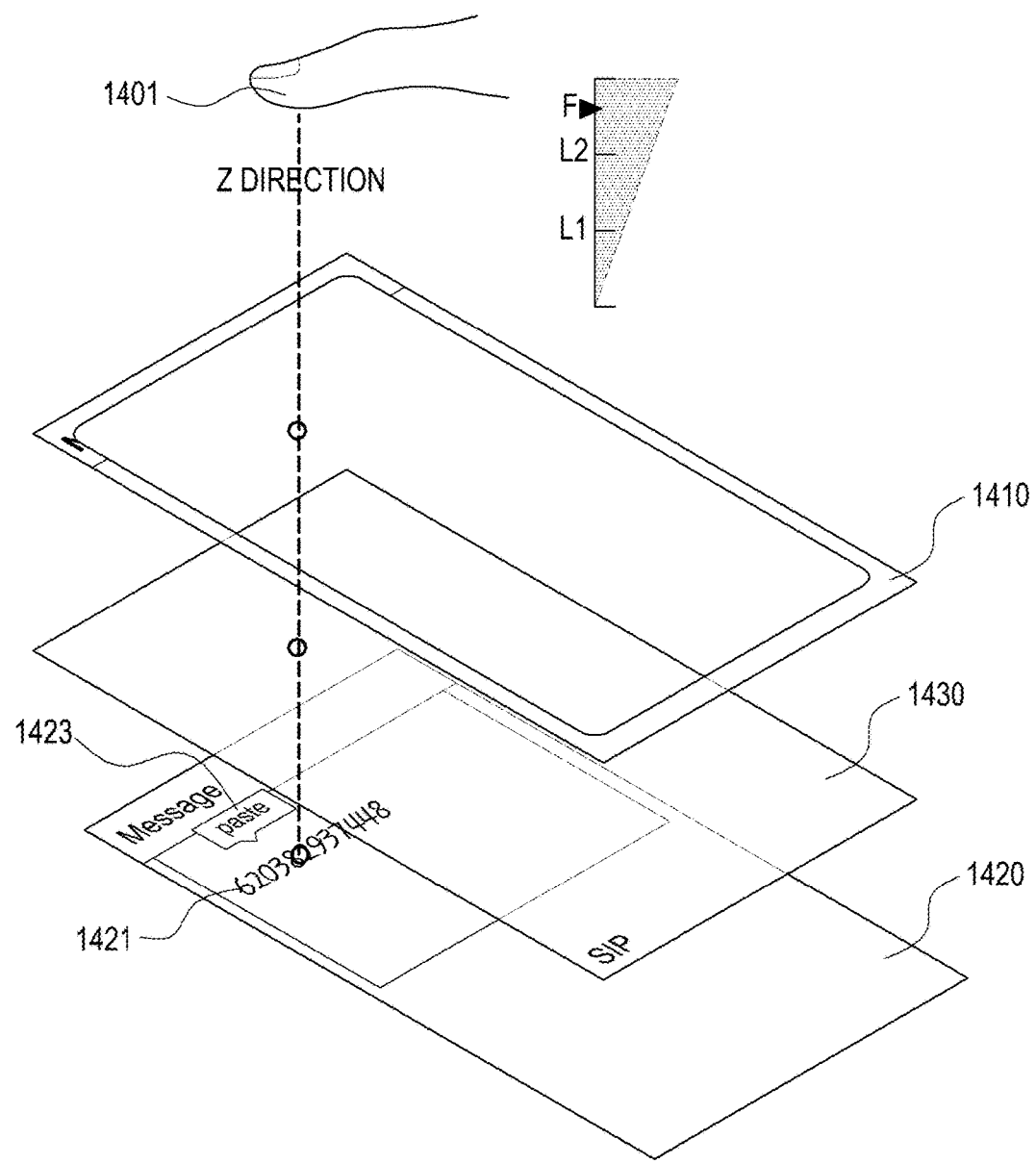
Figure 14D:
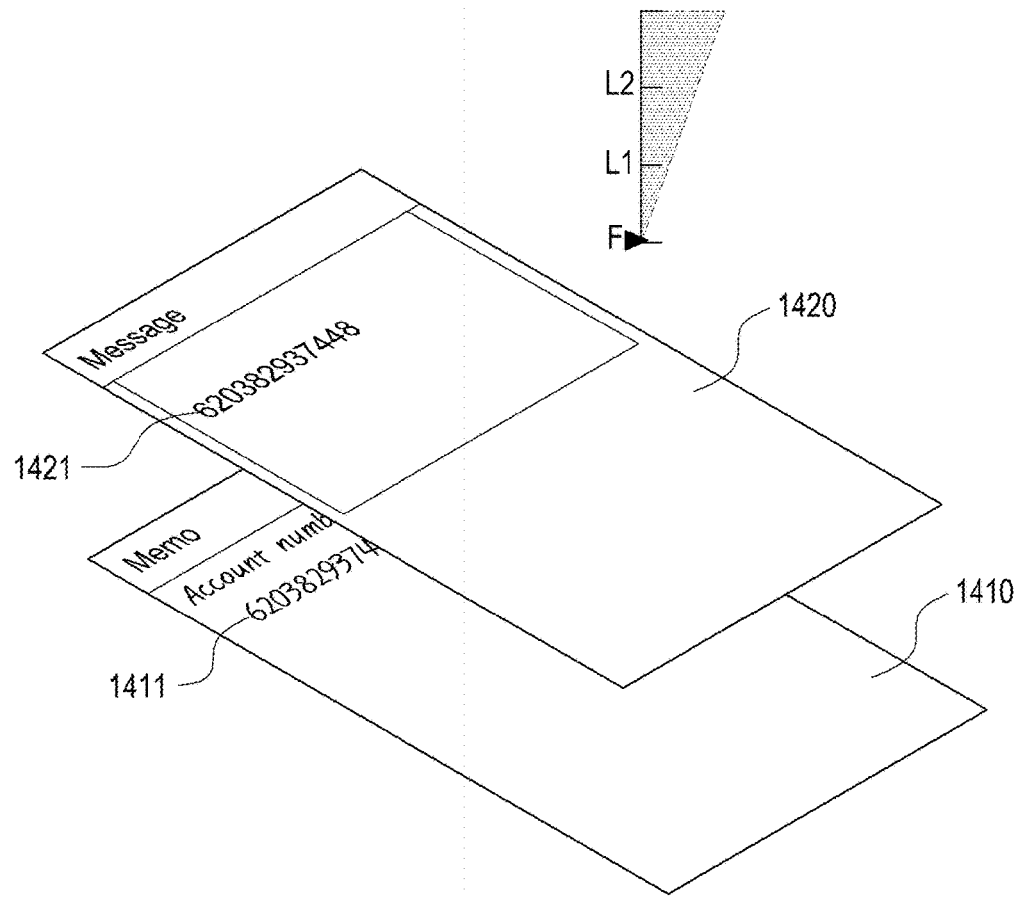

In the state illustrated in FIG. 14C, when a pressure value (F) of a pressure input, which is input as higher pressure is applied, is greater than or equal to a second threshold value (L2), the electronic device may display the text data 1421 and the related data 1423 in the third user interface 1430, which is a third layer. Referring to FIG. 14D, when the z-axis pressure input is released, the electronic device processes the first user interface 1410 as a background, and may display a layer displaying the second user interface 1420 on top.

FIGS. 15A, 15B, 15C, 15D, 15E and 15F are diagrams illustrating examples of displaying user interfaces on a display of an electronic device according to various example embodiments of the present disclosure.

Figure 15A:
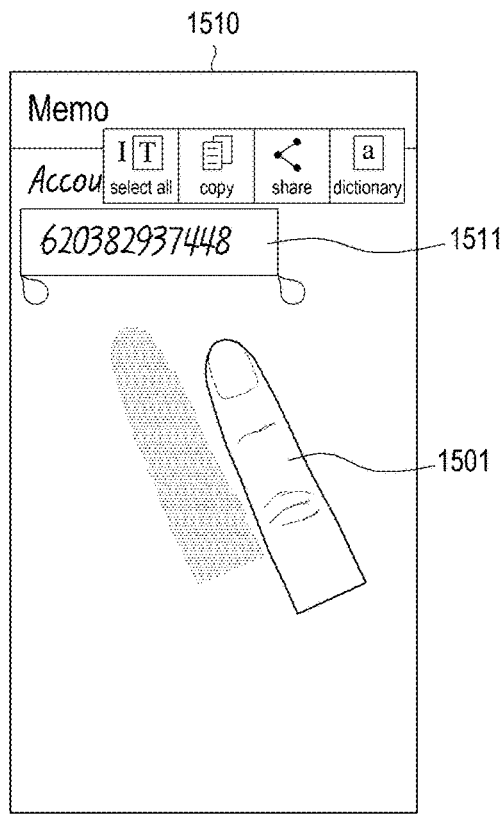
Figure 15A:
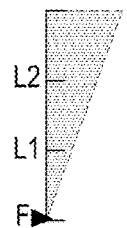

Referring to FIGS. 15A, 15B, 15C, 15D, 15E and 15F, an electronic device according to various embodiments of the present disclosure may display a first user interface 1510 related to a first function (e.g., a memo function), and may display predetermined selected text 1511, as illustrated in FIG. 15A.

Figure 15B:
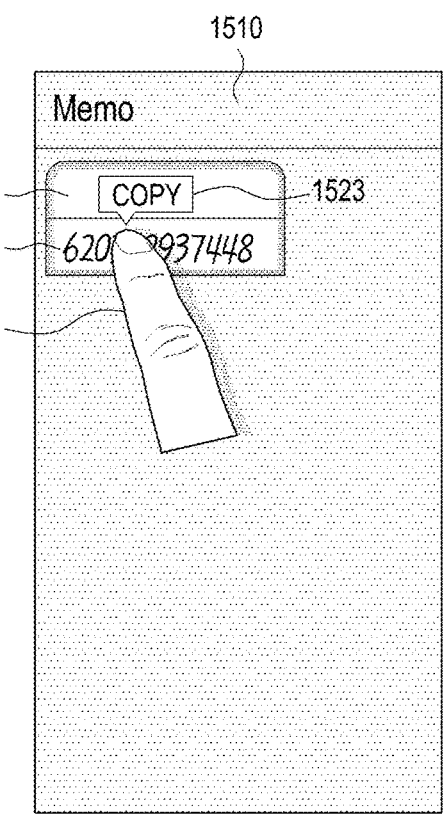
Figure 15B:
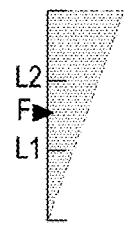

As illustrated in FIG. 15B, the electronic device may receive a user input 1501 on selected text. When the user input 1501 is input including a z-axis pressure (e.g., a pressure value (F) between a first threshold value (L1) and a second threshold value (L2)), the electronic device may layer the displayed first user interface 1510 and a newly configured second user interface 1520 and may display the same. In response to the input 1501, the electronic device may overlappingly display the second user interface 1520 including a 'copy indicator' 1523 and a 'text indicator (620382937448)' 1521, under the first user interface 1510.

As illustrated in FIG. 15C, when the user input 1501 including pressure (F) is released in the state illustrated in FIG. 15B, the electronic device restores the separated state of the user interfaces (e.g., layers) to an original state, stores the selected text data 1511 in a clipboard, and displays an item (indicator) 1513 related to the stored text data to correspond to a user hover input location. As illustrated in FIG. 15D, the electronic device may display a third user interface 1530 including the item (indicator) 1513 related to the stored text data.

Figures 15E, 15F:
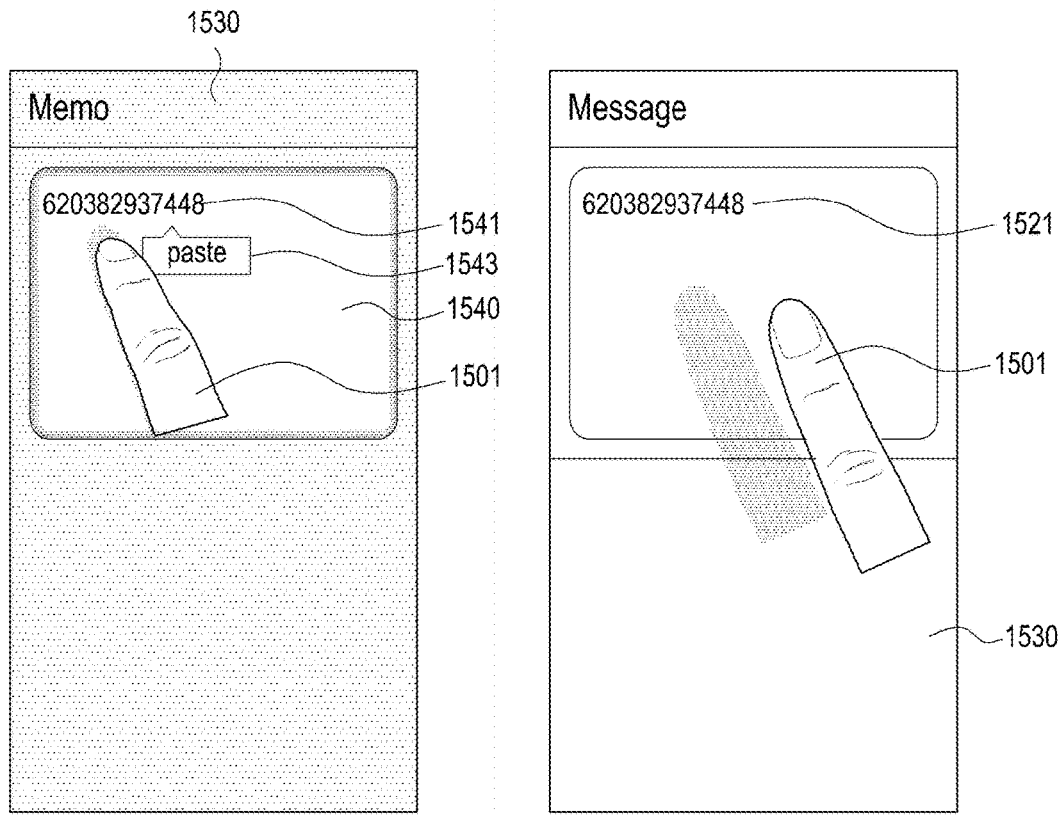

As illustrated in FIG. 15E, when user input 1501 including a pressure value (F) greater than or equal to a first threshold value (L1) is received, the electronic device may layer the third user interface 1530 for providing a function for pasting the text data stored in the clipboard, that is, a third function, on a fourth user interface 1540, and may display the same to appear in a concave form. The electronic device may display the third user interface 1530 including an item (e.g., a 'text indicator (620382937448)' 1541 and a 'paste indicator' 1543) generated in response to the input, and may overlappingly display the same under the fourth user interface 1540. As the third user interface 1530 and the fourth user interface 1540 are displayed to overlap each other, the electronic device may process a partial area of the third user interface located on top, that is, an area corresponding to an area where the items of the third user interface are displayed, to be transparent, and may display the same.

As illustrated in FIG. 15F, when the z-axis pressure input 1501 is released, the electronic device may restore the separated state of the layers to an original state, and may display the third user interface 1530 to which the text data 1521 stored in the clipboard is applied on the screen of the display.

According to various embodiments, the electronic device may distinguish a user finger during the reception of a user input. The finger may be at least one of the left thumb, the left index finger, the left middle finger, the left ring finger, and the left little finger, the right thumb, the right index finger, the right middle finger, the right ring finger, and the right little finger of a predetermined user. A method of distinguishing the finger may be based on fingerprint pattern information received from a fingerprint sensor adjacent to a display. The electronic device may distinguish a storage location in a clipboard where selected data (text, an image, or the like) is stored, based on the finger which is distinguished during the reception of the user input.

FIGS. 16A, 16B, 16C, 16D, 16E and 16F are diagrams illustrating examples of displaying user interfaces on a display of an electronic device according to various example embodiments of the present disclosure.

Referring to FIGS. 16A, 16B, 16C, 16D, 16E and 16F, an electronic device according to various embodiments of the present disclosure may select data to be applied from among a plurality of pieces of data stored in a clipboard, based on the number of z-axis pressure inputs.

The electronic device may display selected text 1611 in a first user interface 1610, as illustrated in FIG. 16A, and may receive user input 1601 including z-axis pressure (F) on the selected text 1611, as illustrated in FIG. 16B. The electronic device may store the text data 1611 in a first storage of the clipboard in response to the input. The electronic device may display a function menu 1613 in the first user interface 1610. According to various embodiments, when a copy function is selected, the selected text 1611 (e.g., EEE) may be copied based on the user input 1610, and the copied text 1611 may be stored in the clipboard, as illustrated in FIG. 16B. Also, the electronic device may select other text, may receive input including z-axis pressure (F) on the selected other text, and may store the text data in a second storage of the clipboard in response to the input. Through the above process, the electronic device may store a plurality of pieces of data in different locations of the clipboard.

Figure 16C:
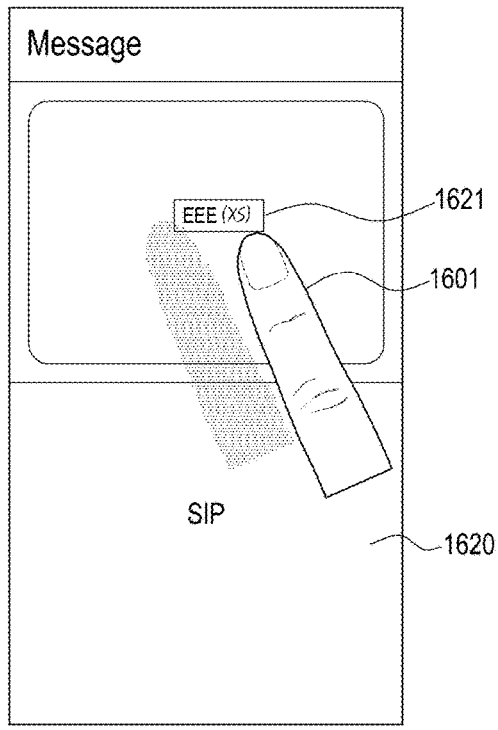

As illustrated in FIG. 16C, the electronic device may display a second user interface 1620 related to a second function, and may display an indicator (e.g., EEE(x5)) 1621 associated with data, which is stored last in the clipboard, based on a hover input by a user. For example, the electronic device may display the indicator 1621 indicating that 5 pieces of copied data (EEE) exist in the clipboard, in the second user interface 1620 based on a hovering input by a user.

Figure 16D:
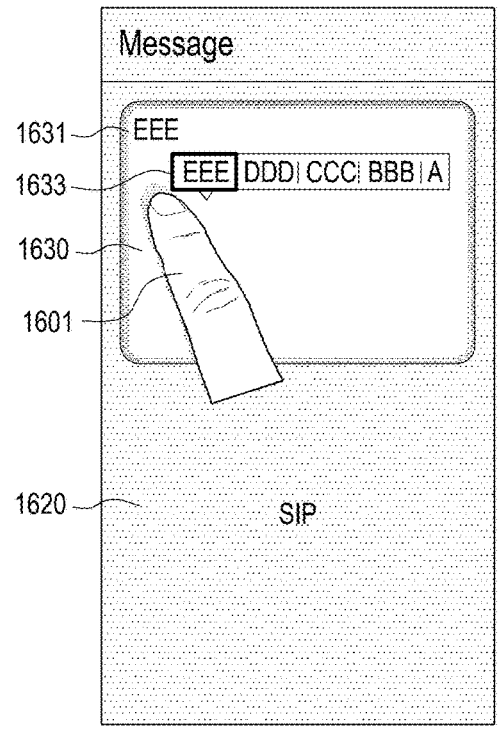

As illustrated in FIG. 16D, when input including, for example, z-axis pressure (F) greater than a first threshold value is received in a text field area displayed on a screen, the electronic device provides the data 1631 (e.g., EEE) that was stored last in the clipboard to a third function, and displays an indicator 1633 of a plurality of pieces of data stored in the clipboard. The electronic device may display an item related to the third function (e.g., the data 1631 (EEE) and the indicator 1633) in the third user interface 1630, and may overlappingly display the third user interface 1630 under the second user interface 1620. The electronic device may display the first user interface 1610 such that an area corresponding to the location where the third user interface 1630 is overlappingly displayed is processed to be transparent.

Figures 16E, 16F:
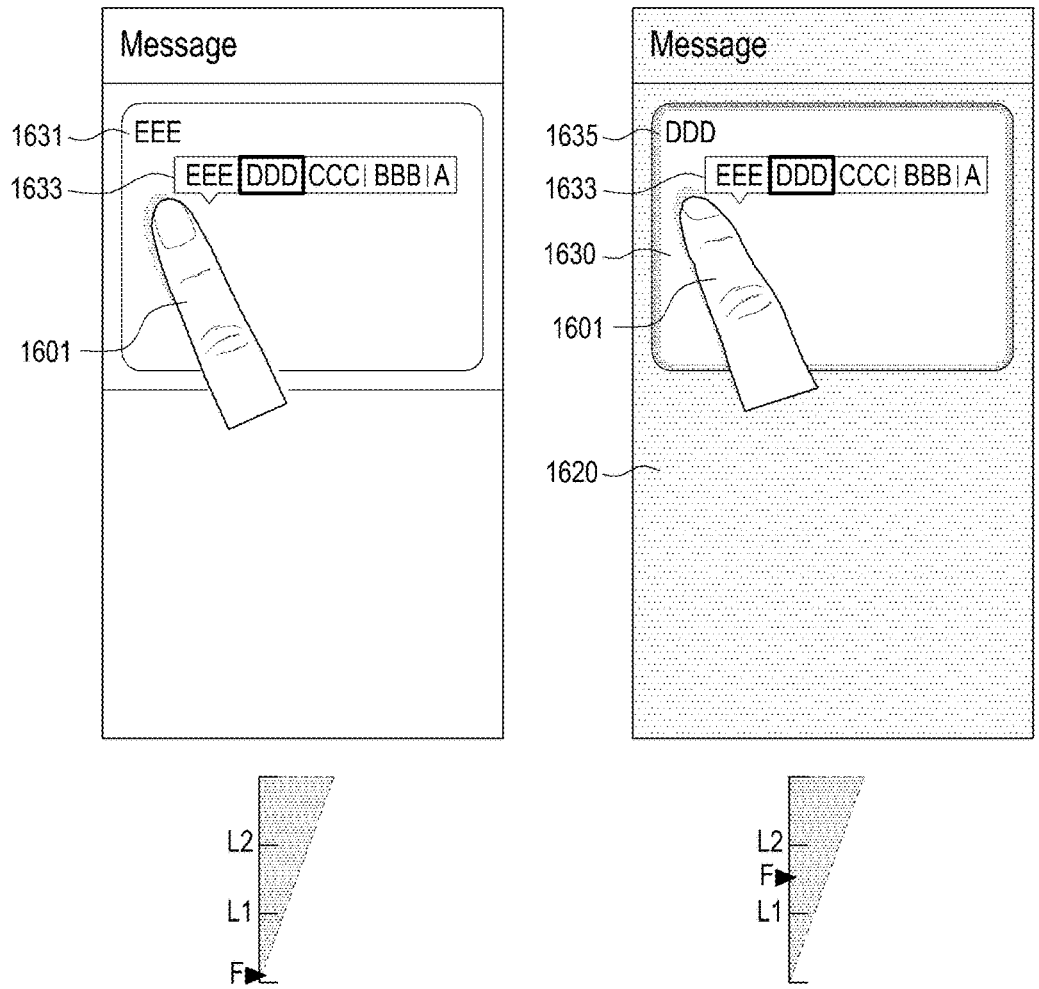

As illustrated in FIG. 16E, when the z-axis pressure (F) of the input including the z-axis pressure (F) is less than or equal to a first threshold value (L1), the electronic device may display the data (e.g., DDD) that was stored last after the displayed data 1631 (e.g., EEE) in the state of being selected in the data indicator 1633 indicating the plurality of pieces of data.

Also, as illustrated in FIG. 16F, when input 1601 including z-axis pressure (F) greater than or equal to a threshold value is received again, the electronic device may display the selected data 1635 in the third user interface 1630. The electronic device may display items related to the third function (e.g., the data (DDD) 1635 and the indicator 1633) in the third user interface 1630, and may overlappingly display the third user interface 1630 under the second user interface 1620. The electronic device may display the first user interface 1610 in which an area corresponding to the location where the third user interface 1630 is overlappingly displayed is processed to be transparent.

Figures 17A, 17B:
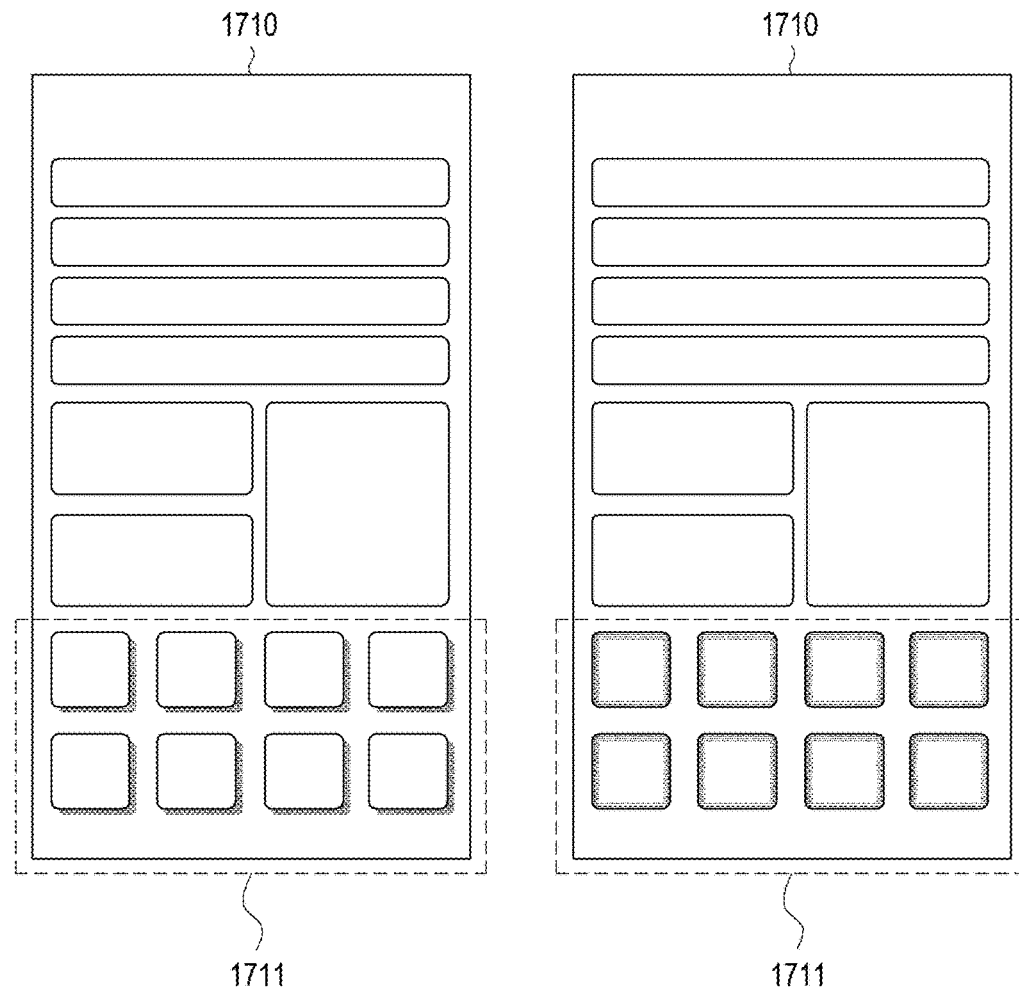
FIGS. 17A and 17B are diagrams illustrating examples of displaying user interfaces on a display of an electronic device according to various example embodiments of the present disclosure.

FIGS. 17A and 17B are diagrams illustrating examples of displaying user interfaces on a display of an electronic device according to various example embodiments of the present disclosure.

Referring to FIGS. 17A and 17B, an electronic device according to various embodiments of the present disclosure may provide a shade effect. For example, the electronic device may provide a shadow effect to eight icons 1711 in a lower display area included in a user interface 1710 in response to a z-axis pressure input, as illustrated in FIG. 17A, or may display a three-dimensional effect as shown in FIG. 17B. Through the above, the electronic device may enable a user to recognize that depth in the z-axis direction exists, and may display the user interface 1710 such that the icons can be distinguished from other icons that do not respond to z-axis pressure input.

Figure 18A:
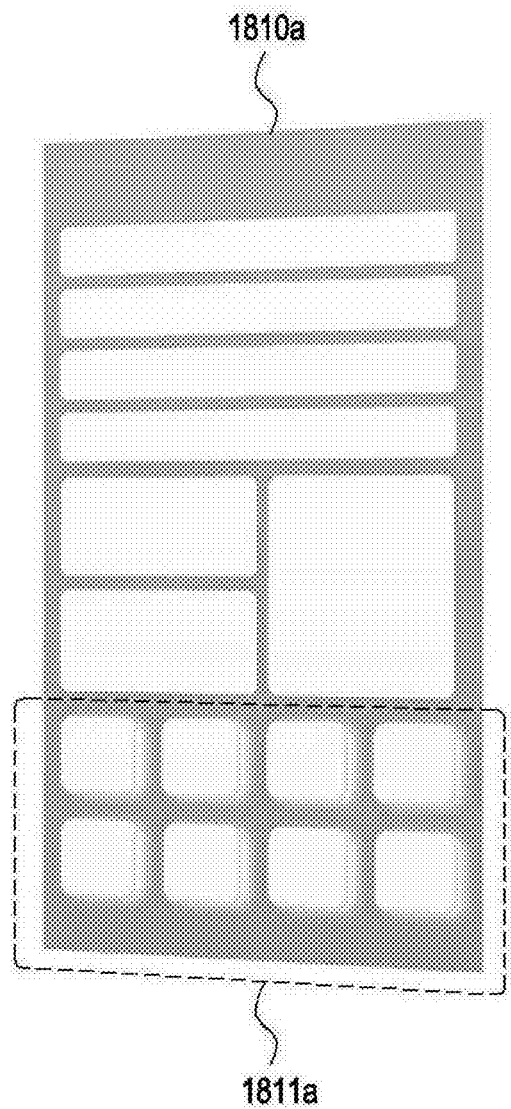
FIGS. 18A and 18B are diagrams illustrating examples of displaying user interfaces on a display of an electronic device according to various example embodiments of the present disclosure.
Figure 18B:
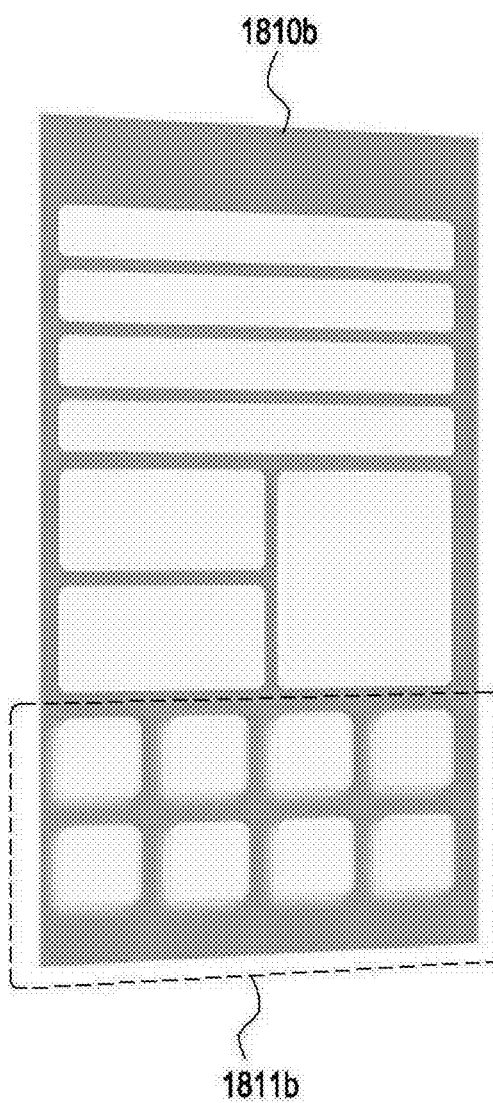

FIGS. 18A and 18B are diagrams illustrating examples of displaying user interfaces on a display of an electronic device according to various example embodiments of the present disclosure.

Referring to FIGS. 18A and 18B, an electronic device according to various embodiments of the present disclosure may perform processing so as to provide a blur effect around a lower display area 1811a that displays eight icons of a user interface 1810a which responds to z-axis pressure input, and may display a changed lower display area 1811b. The electronic device displays the changed user interface 1810b, whereby a user recognizes that depth in the z-axis direction exists, and the icons are distinguished from other icons that do not respond to z-axis pressure input. Here, the effects used for distinguishing may differently provide displaying based on the amount of information related to a corresponding icon or the degree of depth. According to various embodiments, the electronic device senses a change in the angle between a user and the electronic device, and changes a display area and a direction of the depth effect as the angle changes, thereby more accurately displaying that depth in the z-axis direction exists. Also, according to various embodiments, the electronic device may provide feedback output, which responds to user input on each item, to be different in order to distinguish an item that responds to z-axis pressure input from an item that does not respond to the z-axis pressure input. For example, the electronic device may provide a vibration pattern that responds to user input on eight items in the lower portion, which respond to z-axis pressure input, to be different from a vibration pattern that responds to user input on other items. The electronic device may provide a sound effect that responds to user input on eight items in the lower portion, which respond to z-axis pressure input, to be different from a sound effect in response to user input on other items.

Figure 19:
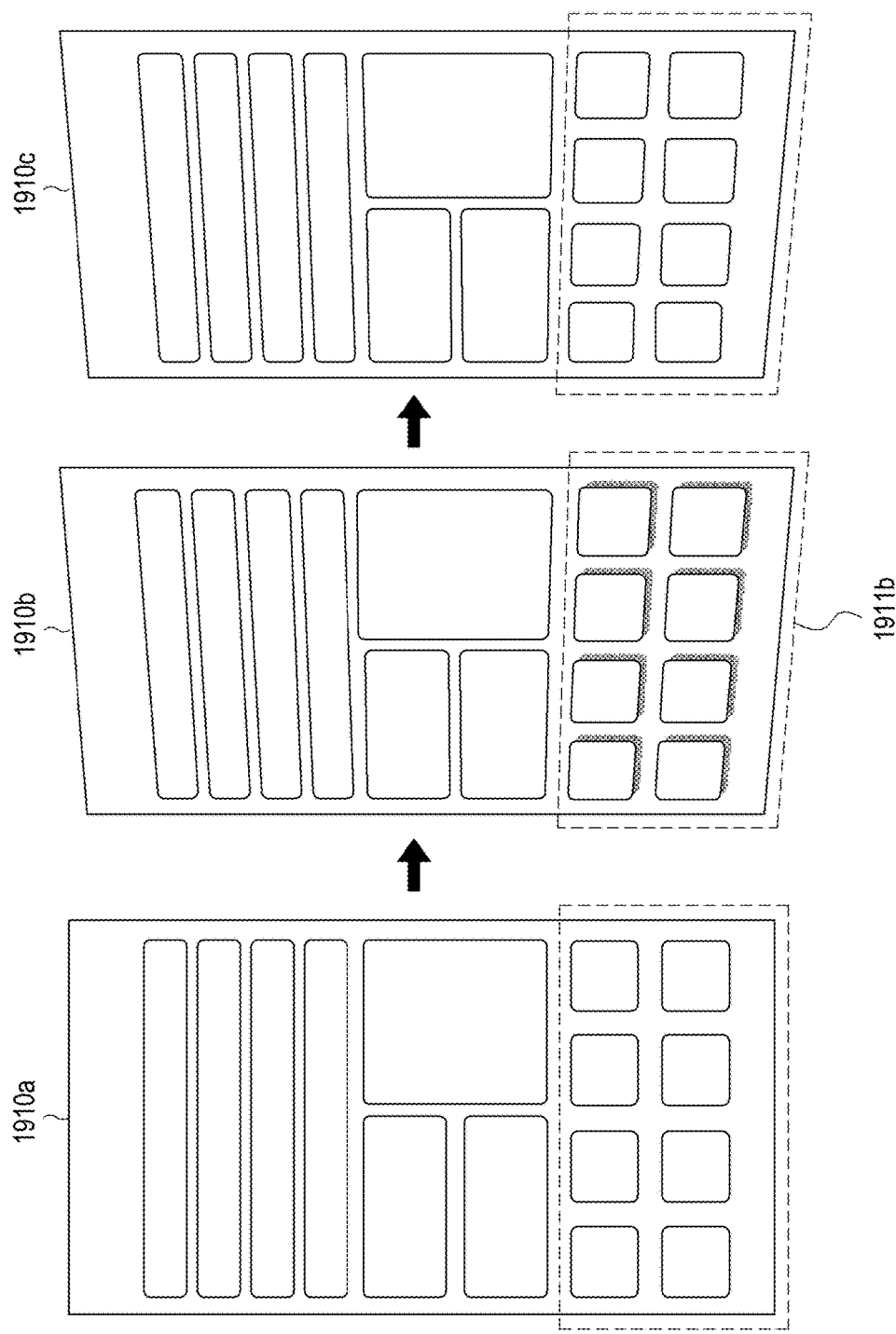
FIG. 19 is a diagram illustrating an example of displaying user interfaces on a display of an electronic device according to various example embodiments of the present disclosure.

FIG. 19 is a diagram illustrating an example of displaying user interfaces on a display of an electronic device according to various example embodiments of the present disclosure.

Referring to FIG. 19, an electronic device according to various embodiments of the present disclosure may sense a change in the angle between a user and the electronic device, and may change a display angle of a user interface 1910a as the angle changes, whereby changed user interfaces 1910b and 1910c are sequentially displayed. In this instance, the electronic device may differently process a visual effect of icons displayed in a lower area 1911b of the changed user interface 1910b, and may display the same. Accordingly, the electronic device temporarily provides the depth effect, and may enable a user to recognize that depth in the z-axis direction exists.

Figure 20:
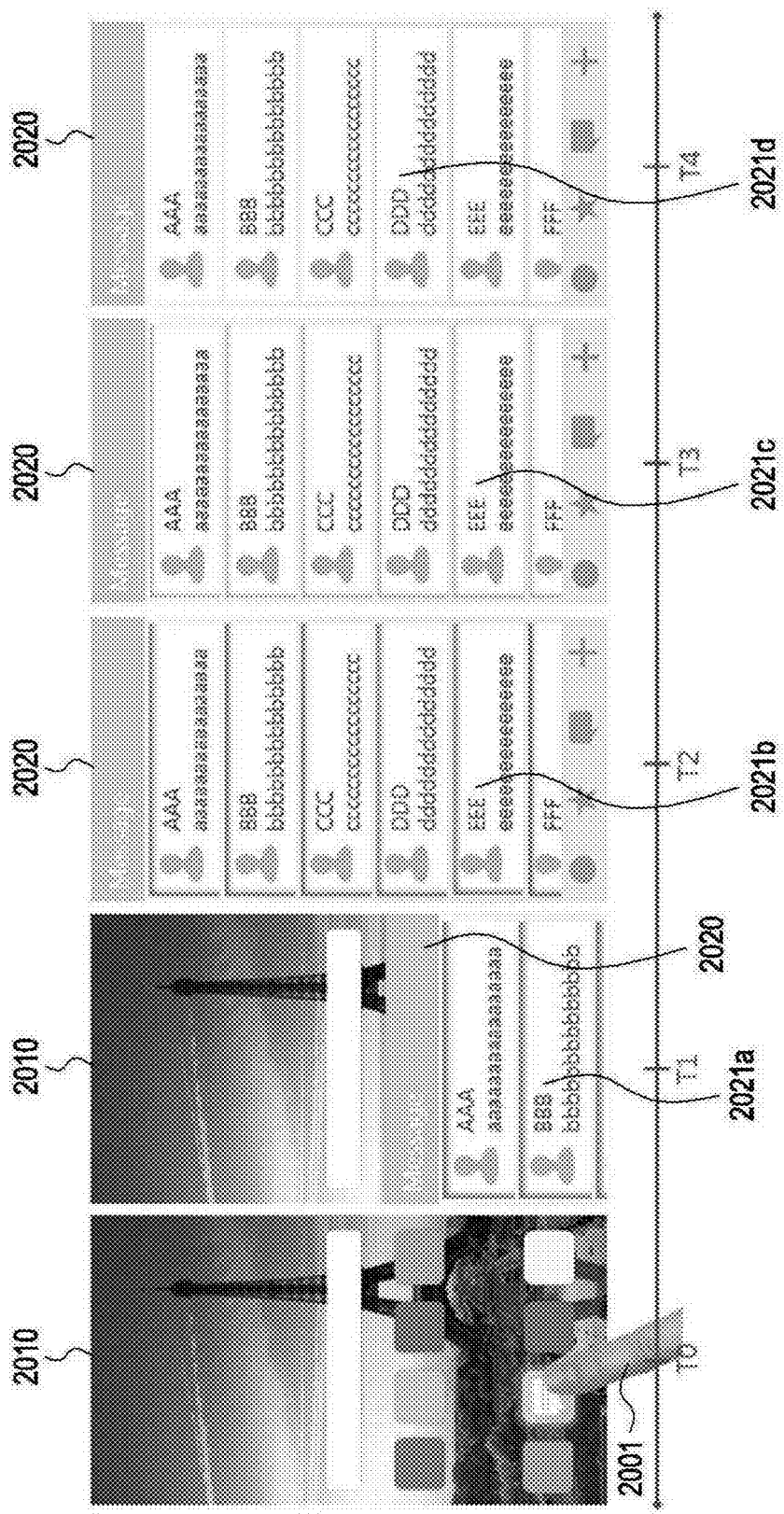
FIG. 20 is a diagram illustrating an example of displaying user interfaces on a display of an electronic device according to various example embodiments of the present disclosure.
Figure 21:
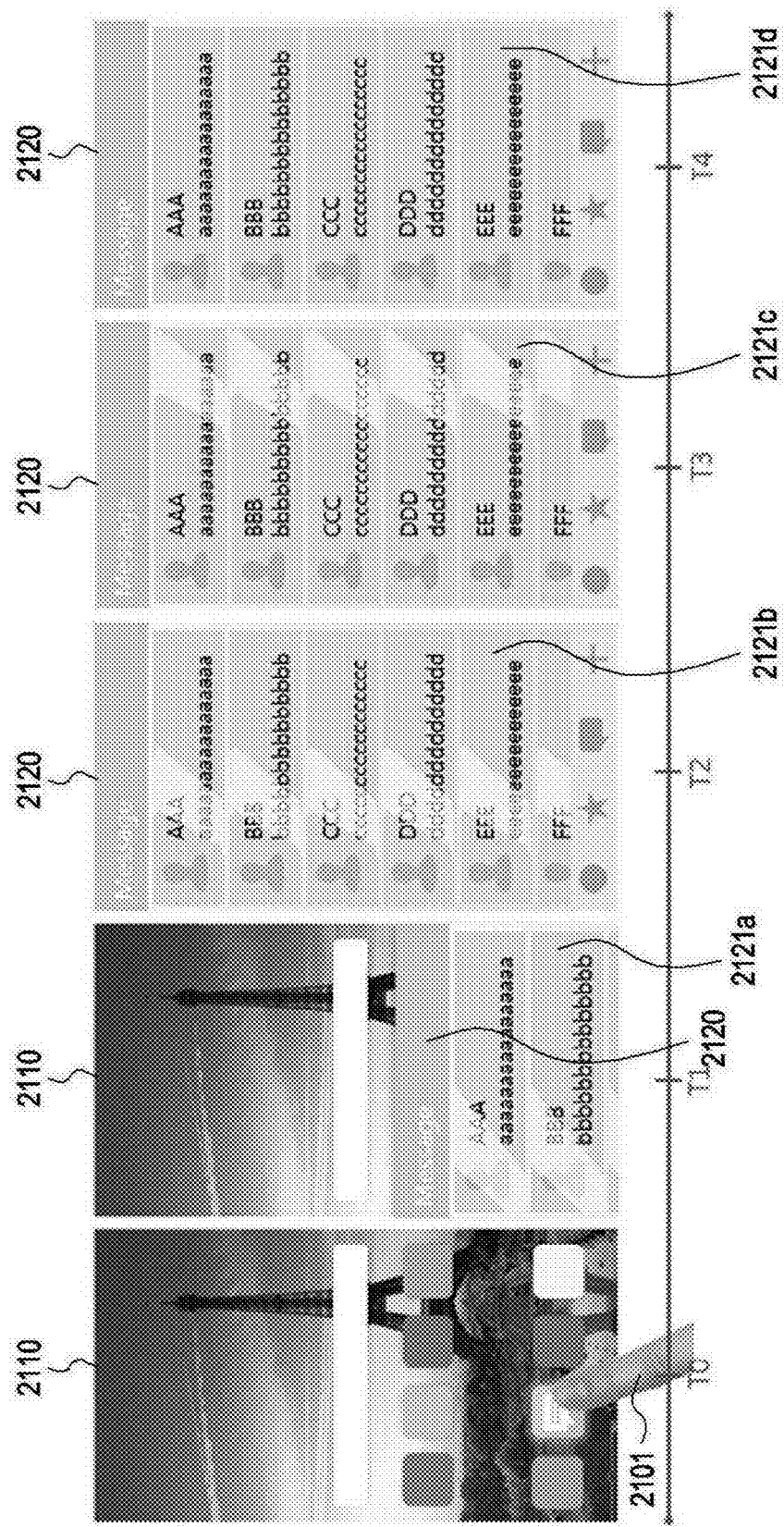
FIG. 21 is a diagram illustrating an example of displaying user interfaces on a display of an electronic device according to various example embodiments of the present disclosure.

FIGS. 20 and 21 are diagrams illustrating examples of displaying user interfaces on a display of an electronic device according to various example embodiments of the present disclosure.

Referring to FIG. 20, when a predetermined function (or application) is executed (woken up), or a full screen is updated by a predetermined function, an electronic device according to various embodiments of the present disclosure may display a predetermined effect with respect to an item including a z-axis depth to enable a user to recognize the corresponding item during a predetermined period of time from the point in time at which a screen is switched and a new screen is displayed.

As illustrated in FIG. 20, during a T0 interval, the electronic device may receive, from a user, input 2001 including z-axis pressure with respect to an icon that is included in a first user interface 2010 and is displayed in association with a predetermined function. The electronic device may display at least a part 2021a of a function (e.g., address list) related to the selected icon in a second user interface 2020 during a T1 interval, in response to the reception of the pressure input 2001. The electronic device may display a predetermined effect with respect to the selected item in the second user interface 2020 in the state in which the at least a part of the function is displayed.

During a T2 interval, the electronic device may display the second user interface 2020 in the entire display area of a touchscreen, and may continuously display a predetermined effect 2021b with respect to the function related to the selected item in the second interface 2020. Also, the electronic device may display a predetermined effect 2021c, which removes a visual effect over time, in the second user interface 2020 during a T3 interval. The electronic device may display a predetermined effect 2021d, which prevents the visual effect from being displayed, in the second user interface 2020 during a T4 interval. Here, the visual effect may be a shadow effect.

The operations of changing the display of user interfaces as illustrated in FIG. 21 may be the same as the operations that have been described with reference to FIG. 20. When input 2101 including z-axis pressure with respect to an icon included in a first user interface 2110 is received, the electronic device may display a predetermined effect 2121a, 2121b, 2121c, and 2121d that provides only a visual effect, such as a three-dimensional effect or light effect, in the second user interface 2120.

A control method of an electronic device according to any one of various example embodiments of the present disclosure may include: displaying a user interface including at least one item on a touchscreen display of the electronic device; receiving an input for selecting at least one item through the touchscreen display; sensing pressure applied to, and/or around, the at least one item on the display using the pressure sensor while the input is received; selecting a part of the user interface at least partially based on the input and the sensed pressure; and providing a visual effect to the user interface based on at least a part of the sensed pressure such that the selected part of the user interface is displayed to appear concave compared with the remaining part of the user interface.

According to various example embodiments of the present disclosure, the method may further include removing the visual effect at least partially based on the sensed pressure.

According to various example embodiments of the present disclosure, providing the visual effect may include displaying a popup window or a menu on, and/or close to, the at least one item at least partially based on the sensed pressure while the visual effect is provided.

According to various example embodiments of the present disclosure, the visual effect may include at least one of: a boundary line, a gradation, and a shadow for distinguishing the selected part of the user interface from the remaining part of the user interface.

According to various example embodiments of the present disclosure, the visual effect may include one or more of a transparency, sharpness, a color, or a 3D effect between the selected part and the remaining part of the user interface.

According to various example embodiments of the present disclosure, the visual effect may include a first level of transparency for the selected part and a second level of transparency for the remaining part of the user interface, and the first level may be greater than the second level.

According to various example embodiments of the present disclosure, the user interface may include at least one item including icons indicating a home screen and an application program.

A control method of an electronic device according to any one of various example embodiments of the present disclosure may include: displaying a first user interface on a touchscreen display of the electronic device; receiving an input for providing at least one item through the first user interface; displaying the at least one item of the first user interface; sensing a pressure applied on, and/or close to, the at least one item on the display using the pressure sensor while the at least one item of the first user interface is displayed; and displaying a second user interface on the touchscreen display based on at least a part of the sensed pressure such that the second user interface includes the at least one item.

According to various example embodiments of the present disclosure, the at least one item may include at least one of: text, a number, an image, a symbol, and a video.

According to various example embodiments of the present disclosure, the first application program may be configured to store and correct text, and the second application program may be configured to be used for communication with an external device.

Figure 22:
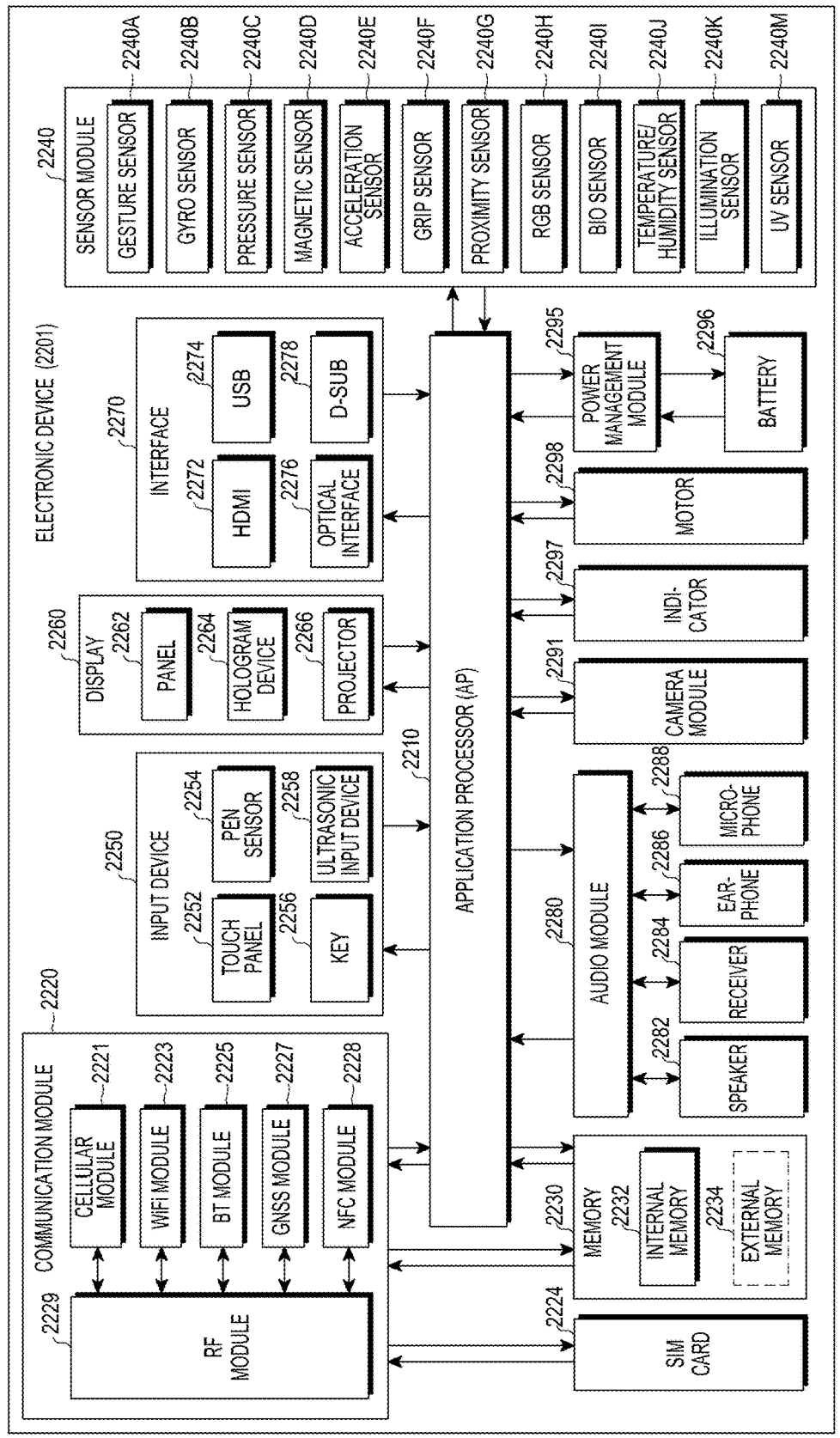
FIG. 22 is a block diagram illustrating an example electronic device according to various example embodiments.

FIG. 22 is a block diagram illustrating an example electronic device according to various embodiments.

The electronic device 2201 may include, for example, all or part of the electronic device 101 illustrated in FIG. 1.

The electronic device 2201 may include at least one processor (e.g., including processing circuitry) 2210 (e.g., an AP), a communication module (e.g., including communication circuitry) 2220, a subscriber identification module 2224, a memory 2230, a sensor module 2240, an input device (e.g., including input circuitry) 2250, a display 2260, an interface (e.g., including interface circuitry) 2270, an audio module 2280, a camera module 2291, a power management module 2295, a battery 2296, an indicator 2297, and a motor 2298.

The processor 2210 may include various processing circuitry and control a plurality of hardware or software elements connected thereto and may perform various data processing and operations by driving an operating system or an application program. The processor 2210 may be embodied, for example, as a System on Chip (SoC). According to an embodiment, the processor 2210 may further include a graphic processing unit (GPU) and/or an image signal processor. The processor 2210 may also include at least some of the elements illustrated in FIG. 22 (e.g., a cellular module 2221). The processor 2210 may load, in volatile memory, instructions or data received from at least one of other elements (e.g., non-volatile memory), may process the loaded instructions or data, and may store the resultant data in the non-volatile memory.

The communication module 2220 may have a configuration that is the same as, or similar to, that of the communication interface 170. The communication module 2220 may include various communication circuitry, such as, for example, and without limitation, a cellular module 2221, a Wi-Fi module 2223, a Bluetooth module 2225, a GNSS module 2227, an NFC module 2228, and an RF module 2229. The cellular module 2221 may provide, for example, a voice call, a video call, a text message service, an Internet service, or the like through a communication network. According to an embodiment, the cellular module 2221 may identify and authenticate the electronic device 2201 within a communication network using the subscriber identification module 2224 (e.g., a SIM card). According to an embodiment, the cellular module 2221 may perform at least some of the functions that the processor 2210 may provide. According to an embodiment, the cellular module 2221 may include a communication processor (CP). According to some embodiments, at least some (e.g., two or more) of the cellular module 2221, the Wi-Fi module 2223, the BT module 2225, the GNSS module 2227, and the NFC module 2228 may be included in one Integrated Chip (IC) or IC package. The RF module 2229, for example, may transmit/receive a communication signal (e.g., an RF signal). The RF module 2229 may include, for example, a transceiver, a Power Amp Module (PAM), a frequency filter, a Low Noise Amplifier (LNA), an antenna, or the like. According to another embodiment, at least one of the cellular module 2221, the Wi-Fi module 2223, the BT module 2225, the GNSS module 2227, and the NFC module 2228 may transmit/receive an RF signal through a separate RF module.

The subscriber identification module 2224 may include, for example, a card that includes a subscriber identification module, or an embedded SIM, and may contain unique identification information (e.g., an Integrated Circuit Card Identifier (ICCID)) or subscriber information (e.g., an International Mobile Subscriber Identity (IMSI)).

The memory 2230 (e.g., the memory 130) may include, for example, an embedded memory 2232 and/or an external memory 2234. The embedded memory 2232 may include, for example, at least one of a volatile memory (e.g., a DRAM, an SRAM, an SDRAM, and the like) and a non-volatile memory (e.g., a onetime programmable ROM (OTPROM), a PROM, an EPROM, an EEPROM, a mask ROM, a flash ROM, a flash memory, a hard disc drive, or a solid state drive (SSD)). The external memory 2234 may include a flash drive, for example, a Compact Flash (CF), a Secure Digital (SD), a Micro-SD, a Mini-SD, an eXtreme digital (xD), a Multi-Media Card (MMC), a memory stick, and the like. The external memory 2234 may be functionally and/or physically connected to the electronic device 2201 through various interfaces.

The sensor module 2240 may, for example, measure a physical quantity or detect the operating state of the electronic device 2201, and may convert the measured or detected information into an electrical signal. The sensor module 2240 may include, for example, at least one of a gesture sensor 2240A, a gyro sensor 2240B, a pressure (e.g., atmospheric/barometric) sensor 2240C, a magnetic sensor 2240D, an acceleration sensor 2240E, a grip sensor 2240F, a proximity sensor 2240G, a color sensor 2240H (e.g., a red, green, blue (RGB) sensor), a biometric (e.g., bio) sensor 2240I, a temperature/humidity sensor 2240J, an illumination sensor 2240K, and an ultraviolet (UV) sensor 2240M. Additionally or alternatively, the sensor module 2240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling one or more sensors included therein. In some embodiments, the electronic device 2201 may further include a processor, which is configured to control the sensor module 2240, as a part of the processor 2210 or separately from the processor 2210 in order to control the sensor module 2240 while the processor 2210 is in a sleep state.

The input device 2250 may include various input circuitry, such as, for example, and without limitation, at least one of a touch panel 2252, a (digital) pen sensor 2254, a key 2256, or an ultrasonic input device 2258. The touch panel 2252 may use, for example, at least one of a capacitive type, a resistive type, an infrared type, and an ultrasonic type. Furthermore, the touch panel 2252 may further include a control circuit. The touch panel 2252 may further include a tactile layer to provide a tactile reaction to a user. The (digital) pen sensor 2254 may include, for example, a recognition sheet that is a part of, or separate from, the touch panel. The key 2256 may include, for example, a physical button, an optical key, or a keypad. The ultrasonic input device 2258 may detect ultrasonic waves, which are generated by an input tool, through a microphone (e.g., a microphone 2288), to identify data corresponding to the detected ultrasonic waves.

The display 2260 (e.g., the display 160) may include a panel 2262, a hologram device 2264, a projector 2266, and/or a control circuit for controlling them. The panel 2262 may be embodied to be, for example, flexible, transparent, or wearable. The panel 2262, together with the touch panel 2252, may be configured as one or more modules. According to an embodiment, the panel 2262 may include a pressure sensor (or a force sensor), which may measure the strength of pressure by a user's touch. The pressure sensor may be integrated with the touch panel 2252 or embodied as one or more sensors, separately from the touch panel 2252. The hologram device 2264 may show a three-dimensional image in the air using light interference. The projector 2266 may display an image by projecting light onto a screen. The screen may be located, for example, in the interior of, or on the exterior of, the electronic device 2201.

The interface 2270 may include various interface circuitry, such as, for example, and without limitation, at least one of an HDMI 2272, a USB 2274, an optical interface 2276, or a D-subminiature (D-sub) 2278 interface. The interface 2270 may be included, for example, in the communication interface 170 illustrated in FIG. 1. Additionally or alternatively, the interface 2270 may include, for example, a Mobile High-Definition Link (MHL) interface, an SD card/Multi-Media Card (MMC) interface, or an Infrared Data Association (IrDA) standard interface.

The audio module 2280, for example, may bilaterally convert a sound into an electrical signal. At least some elements of the audio module 2280 may be included, for example, in the input/output interface 150 illustrated in FIG. 1. The audio module 2280 may process sound information that is input or output through, for example, a speaker 2282, a receiver 2284, earphones 2286, the microphone 2288, and the like. The camera module 2291 is a device that can photograph a still image and a moving image. According to an embodiment, the camera module 291 may include one or more image sensors (e.g., a front sensor or a rear sensor), a lens, an image signal processor (ISP), or a flash (e.g., an LED or xenon lamp).

The power management module 2295 may manage, for example, the power of the electronic device 2201. According to an embodiment, the power management module 2295 may include a Power Management Integrated Circuit (PMIC), a charger IC, or a battery or fuel gauge. The PMIC may use a wired and/or wireless charging method. The wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 2296 and the voltage, current, or temperature while charging. The battery 2296 may include, for example, a rechargeable battery and/or a solar cell.

The indicator 2297 may indicate a particular state (e.g., a booting state, a message state, a charging state, and the like) of the electronic device 2201 or a part (e.g., the processor 2210) thereof. The motor 2298 may convert an electrical signal into a mechanical vibration and may generate a vibration, a haptic effect, or the like. The electronic device 2201 may include a mobile TV support device that can process media data according to a standard such as Digital Multimedia Broadcasting (DMB), Digital Video Broadcasting (DVB), MediaFlo™, or the like. Each of the above-described elements in the present disclosure may be configured with one or more components, and the names of the corresponding elements may vary based on the type of electronic device. In various embodiments, an electronic device (e.g., the electronic device 2201) may omit some elements or may further include additional elements, or some of the elements of the electronic device may be combined with each other to configure one entity, in which case the entity may identically perform the functions of the corresponding elements prior to the combination.

Figure 23:
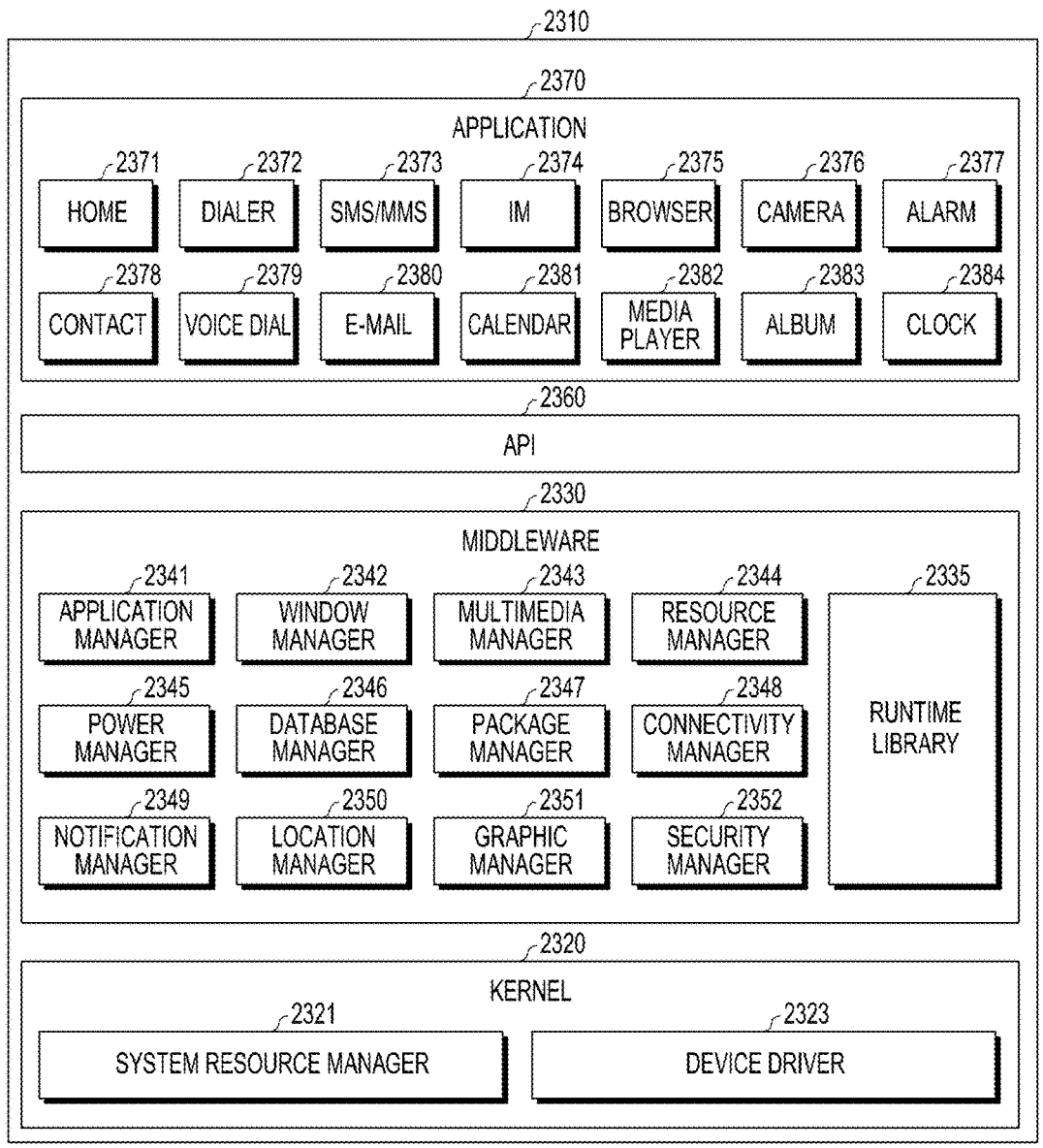
FIG. 23 is a block diagram illustrating an example program module according to various example embodiments.

FIG. 23 is a block diagram illustrating an example program module according to various example embodiments.

According to an embodiment, a program module 2310 (e.g., the program 140) may include an Operating System (OS) that controls resources relating to an electronic device (e.g., the electronic device 101) and/or various applications (e.g., the application programs 147) that are driven on the operating system. The operating system may include, for example, Android™, iOS™, Windows™, Symbian™, Tizen™, or Bath™. Referring to FIG. 23, the program module 2310 may include a kernel 2320 (e.g., the kernel 141), middleware 2330 (e.g., the middleware 143), an API 2360 (e.g., the API 145), and/or applications 2370 (e.g., the application programs 147). At least a part of the program module 2310 may be preloaded on an electronic device, or may be downloaded from an external electronic device (e.g., the electronic device 102 or 104 or the server 106).

The kernel 2320 may include, for example, a system resource manager 2321 and/or a device driver 2323. The system resource manager 2321 may control, allocate, or retrieve system resources. According to an embodiment, the system resource manager 2321 may include a process manager, a memory manager, or a file system manager. The device driver 2323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 2330 may provide a function required by the applications 2370 in common, or may provide various functions to the applications 2370 through the API 2360 to enable the applications 2370 to use the limited system resources within the electronic device. According to an embodiment, the middleware 2330 may include at least one of a runtime library 2335, an application manager 2341, a window manager 2342, a multi-media manager 2343, a resource manager 2344, a power manager 2345, a database manager 2346, a package manager 2347, a connectivity manager 2348, a notification manager 2349, a location manager 2350, a graphic manager 2351, and a security manager 2352.

The runtime library 2335 may include, for example, a library module that a compiler uses in order to add a new function through a programming language while the applications 2370 are being executed. The runtime library 2335 may manage input and output, manage memory, or process an arithmetic function. The application manager 2341 may manage, for example, the life cycles of the applications 2370. The window manager 2342 may manage GUI resources used for a screen. The multimedia manager 2343 may identify formats required for reproducing various media files, and may encode or decode a media file using a codec suitable for the corresponding format. The resource manager 2344 may manage the source code of the applications 2370 or space in memory. The power manager 2345 may manage, for example, the capacity or power of a battery and may provide power information required for operating the electronic device. According to an embodiment, the power manager 2345 may interoperate with a Basic Input/Output System (BIOS). The database manager 2346 may, for example, generate, search, or change databases to be used by the applications 2370. The package manager 2347 may manage the installation or update of an application that is distributed in the form of a package file.

The connectivity manager 2348 may manage, for example, a wireless connection. The notification manager 2349 may provide an event (e.g., an arrival message, an appointment, a proximity notification, and the like) to a user. The location manager 2350 may manage, for example, information about the location of the electronic device. The graphic manager 2351 may manage a graphic effect to be provided to a user and a user interface relating to the graphic effect. The security manager 2352 may provide, for example, system security or user authentication. According to an embodiment, the middleware 2330 may include a telephony manager for managing a voice or video call function of an electronic device or a middleware module that is capable of forming a combination of the functions of the above-described elements. According to an embodiment, the middleware 2330 may provide a module specialized for each type of operating system. Furthermore, the middleware 2330 may dynamically remove some of the existing elements, or may add new elements.

The API 2360 is, for example, a set of API programming functions, and may be provided as different configurations depending on the operating system. For example, in the case of Android or iOS, one API set may be provided for each platform, and in the case of Tizen, two or more API sets may be provided for each platform.

The applications 2370 may include, for example, a home 2371, a dialer 2372, an SMS/MMS 2373, instant messaging (IM) 2374, a browser 2375, a camera 2376, an alarm 2377, contacts 2378, a voice dialer 2379, e-mail 2380, a calendar 2381, a media player 2382, an album 2383, and a clock 2384. Additionally or alternatively, though not shown, the applications 2370 may include health care information (e.g., measuring exercise quantity or blood glucose), an environment-information-providing application (e.g., atmospheric pressure, humidity, or temperature information), and the like. According to an embodiment, the applications 2370 may include an information exchange application that can support the exchange of information between an electronic device and an external electronic device. The information exchange application may include, for example, a notification relay application for relaying predetermined information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may install, delete, or update functions of an external electronic device that communicates with an electronic device (e.g., turning on/off the external electronic device itself (or some elements thereof) or adjusting the brightness (or resolution) of a display) or applications executed in the external electronic device. According to an embodiment, the applications 2370 may include applications (e.g., a health care application of a mobile medical appliance) that are designated according to the attributes of an external electronic device. According to an embodiment, the applications 2370 may include applications received from an external electronic device. At least a portion of the program module 2310 may be implemented (e.g., executed) by software, firmware, hardware (e.g., the processor 120), or a combination of two or more thereof, and may include a module, a program, a routine, an instruction set, or a process for performing one or more functions.

The term "module" as used herein may include a unit comprising hardware, software, or firmware and/or any combinations thereof, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicated processor, a CPU, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The instruction may include a code made by a complier or a code that can be executed by an interpreter. The operations performed by modules, programming modules, or other elements according to various embodiments may be performed in a sequential, parallel, repetitive, or heuristic manner, and some of the operations may be performed in different orders or omitted, or other operations may be added.

According to various example embodiments of the present disclosure, there is provided a non-transitory computer-readable recording medium storing a program to be implemented on a computer, wherein, upon execution by a processor, the program enables the processor to perform: displaying a first user interface including at least one first item on a touchscreen; sensing a pressure applied by an external medium using at least one pressure sensor, upon reception of a touch input on the at least one first item, which is displayed on the touchscreen; generating a second user interface including at least one second item related to the first item, when the pressure is sensed; and changing a display property of a portion of the area related to the second item in the first user interface and the second user interface, based on a pressure value indicated by the sensed pressure, and performing display.

Various example embodiments disclosed herein are provided merely to easily describe technical details of the present disclosure and to aid in understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. An electronic device, comprising:
a touchscreen display;
a pressure sensor configured to detect a pressure applied on the touchscreen display by an external object;
at least one processor electrically connected to the touchscreen display and the pressure sensor; and
a memory electrically connected to the at least one processor,
wherein the memory is configured to store a first application program including a first user interface and a second application program including a second user interface, and
the memory includes instructions which, when executed by the at least one processor, cause the at least one processor to:
display the first user interface on the touchscreen display;
receive an input for providing at least one item through the first user interface;
control the touchscreen display to display the at least one item of the first user interface;
control the pressure sensor to detect a pressure applied to, and/or around, the at least one item on the display while the at least one item of the first user interface is displayed;
control the touchscreen display to displaying the second user interface based at least in part on the sensed pressure, wherein the second user interface includes the at least one item;
wherein the first application program is configured to store and/or correct text, and the second application program is configured to be used for communication with an external device.

2. The electronic device of claim 1, wherein the at least one item includes at least one of: text, a number, an image, a symbol, and a video.

3. The electronic device of claim 1, wherein the memory further includes instructions which, when executed by the at least one processor, cause the at least one processor to:
change a layering order of the first user interface and the second user interface, which are displayed in a manner of being layered on the touchscreen display, based on a direction in which the pressure is applied or a pressure value.

4. The electronic device of claim 1, wherein the memory further includes instructions which, when executed by the at least one processor, cause the at least one processor to:
when the detected pressure is a first pressure value, provide a user interface visual effect in at least part of the first interface and/or the second interface; and
when the detected pressure is a second pressure value, remove the user interface visual effect in the at least part of the first interface and/or the second interface.

5. The electronic device of claim 1, wherein the memory further includes instructions which, when executed by the at least one processor, cause the at least one processor to:
when the at least one item is selected, provide a user interface visual effect in a part of the first user interface based on the sensed pressure,
wherein the visual effect includes a first level of transparency for the part of the first interface and a second level of transparency for a remaining part of the first interface, and
wherein the first level of transparency is greater than the second level of transparency.

6. The electronic device of claim 5, wherein the visual effect includes at least one of a boundary line, a gradation, a shadow, a transparency, a sharpness, a color, a 3D effect, a bevel effect, an embossing effect, a blur effect, or a movement effect.

7. A control method of an electronic device, the method comprising:
controlling a memory of the electronic device to store a first application program including a first user interface and a second application program including a second user interface;
controlling a touchscreen display of the electronic device to display the first user interface;
receiving an input for providing at least one object through the first user interface;

controlling the touchscreen display to display the at least one object;

controlling a pressure sensor to detect a pressure applied on, and/or close to, the at least one object on the display while the at least one object is displayed; and controlling the touchscreen display to display the second user interface based at least in part on the sensed pressure, wherein the second user interface includes at least one object corresponding to the at least one object;

wherein the first application program is configured to store and/or correct text, and the second application program is configured to be used for communication with an external device.

8. The method of claim 7, wherein the at least one object includes at least one of: text, a number, an image, a symbol, and a video.

9. The method of claim 7, further comprising:

changing a layering order of the first user interface and the second user interface, which are displayed in a manner of being layered on the touchscreen display, based on a direction in which the pressure is applied or a pressure value.

10. The method of claim 7, further comprising:

when the detected pressure is a first pressure value, providing a user interface visual effect in at least part of the first interface and/or the second interface; and when the detected pressure is a second pressure value, removing the user interface visual effect in the at least part of the first interface and/or the second interface.

11. The method of claim 7, further comprising:

when at least one object included in a part of the first interface is selected, providing a user interface visual effect in a part of the first user interface, wherein the visual effect includes a first level of transparency for the part of the first interface and a second level of transparency for a remaining part of the first interface, and wherein the first level of transparency is greater than the second level of transparency.

12. The method of claim 11, wherein the visual effect includes at least one of a boundary line, a gradation, a shadow, a transparency, a sharpness, a color, a 3D effect, a bevel effect, an embossing effect, a blur effect, or a movement effect.

13. A non-transitory computer-readable recording medium storing a program to be implemented on a computer, wherein, upon execution by a processor, the program includes executable instructions to enable the processor to perform:

controlling a memory of the electronic device to store a first application program including a first user interface and a second application program including a second user interface;

controlling a touchscreen display of the electronic device to display the first user interface;

receiving an input for providing at least one item through the first user interface;

controlling the touchscreen display to display the at least one item of the first user interface;

controlling a pressure sensor to detect a pressure applied on, and/or close to, the at least one item on the display while the at least one item of the first user interface is displayed; and controlling the touchscreen display to display the second user interface based at least in part on the sensed pressure wherein the second user interface includes the at least one item;

wherein the first application program is configured to store and/or correct text, and the second application program is configured to be used for communication with an external device.

* * * * *